(12) United States Patent
Ripepi

(10) Patent No.: US 10,470,552 B2
(45) Date of Patent: Nov. 12, 2019

(54) MULTIFUNCTIONAL PACK FRAME

(71) Applicant: Philip M. Ripepi, Jefferson Hills, PA (US)

(72) Inventor: Philip M. Ripepi, Jefferson Hills, PA (US)

( * ) Notice: Subject to any disclaimer, the term of this patent is extended or adjusted under 35 U.S.C. 154(b) by 0 days.

(21) Appl. No.: 15/953,096

(22) Filed: Apr. 13, 2018

(65) Prior Publication Data
US 2019/0313776 A1    Oct. 17, 2019

(51) Int. Cl.
*A47C 13/00* (2006.01)
*A45F 3/00* (2006.01)
*A45F 3/10* (2006.01)
*A01M 31/02* (2006.01)

(52) U.S. Cl.
CPC .............. *A45F 3/10* (2013.01); *A01M 31/02* (2013.01); *A47C 13/00* (2013.01); *A45F 2003/003* (2013.01)

(58) Field of Classification Search
CPC ...... A45F 3/08; A45F 4/04; A45F 3/04; A45F 3/26; A47C 4/52; A47C 1/143; A47C 13/00; A47C 4/021; A47C 4/02; A47C 4/20
See application file for complete search history.

(56) References Cited

U.S. PATENT DOCUMENTS

| | | | |
|---|---|---|---|
| 3,889,859 A | 6/1975 | Joseph | |
| 3,896,804 A * | 7/1975 | Ekbladh | A61B 17/42 604/174 |
| 3,897,894 A * | 8/1975 | Lawrence | A45F 3/10 224/261 |
| 3,912,138 A * | 10/1975 | Pava | A45F 4/04 224/154 |
| 3,989,173 A * | 11/1976 | Gebhard | A47D 13/025 224/155 |
| 3,997,213 A * | 12/1976 | Smith | A47O 4/28 297/118 |
| 4,037,763 A * | 7/1977 | Turchen | F16M 13/04 224/153 |
| 4,179,053 A * | 12/1979 | Figura | A45F 3/08 135/120.3 |
| 4,217,998 A * | 8/1980 | Alexander | A45F 3/10 224/261 |
| 4,248,367 A * | 2/1981 | Buel | A45F 4/02 224/153 |
| 4,286,739 A * | 9/1981 | Silcott | A45F 4/02 224/153 |
| 4,300,707 A * | 11/1981 | Kjaer | A45F 4/02 224/155 |
| 4,392,598 A * | 7/1983 | Dixon | A45F 4/02 224/155 |
| 4,450,990 A * | 5/1984 | Bolstad | A45F 4/02 224/155 |

(Continued)

OTHER PUBLICATIONS

International Search Report and Written Opinion of the International Searching Authority, International Application No. PCT/US2019/027150, dated May 3, 2019, pp. 1-8.

*Primary Examiner* — Brian D Nash
(74) *Attorney, Agent, or Firm* — Resolute Legal PLLC

(57) ABSTRACT

A multifunction pack frame is disclosed. The pack frame is convertible to provide a backrest and seating combination to the user. The pack frame also provides a variety of firearm aiming support arrangements.

20 Claims, 12 Drawing Sheets

(56) References Cited

U.S. PATENT DOCUMENTS

| | | | |
|---|---|---|---|
| 4,489,866 A * | 12/1984 | Korte | A45F 4/02 224/155 |
| 4,561,578 A * | 12/1985 | Bell | A45F 3/08 224/153 |
| 4,582,165 A | 4/1986 | Latini | |
| 4,659,142 A * | 4/1987 | Kuchinsky, Jr. | A47C 1/143 280/47.25 |
| 4,738,383 A * | 4/1988 | Dearborn | A45F 4/02 224/153 |
| 4,836,938 A * | 6/1989 | Kobasic | A01M 31/006 224/153 |
| 4,889,383 A * | 12/1989 | Jones | A47C 4/02 297/16.1 |
| 4,896,804 A * | 1/1990 | Dearborn | A45F 3/08 224/153 |
| 5,161,722 A * | 11/1992 | Hembree | A45F 3/08 224/148.2 |
| 5,209,381 A * | 5/1993 | Jay | A45F 4/02 224/155 |
| 5,265,780 A | 11/1993 | Matthews et al. | |
| 5,284,280 A | 2/1994 | Stonebraker et al. | |
| 5,381,941 A | 1/1995 | Brune | |
| 5,409,291 A * | 4/1995 | Lamb | A01K 97/10 224/155 |
| 5,492,255 A | 2/1996 | Gansky et al. | |
| 5,527,088 A * | 6/1996 | MacLean | A45F 4/02 224/155 |
| 5,538,318 A * | 7/1996 | MacLean | A45F 4/02 224/155 |
| 5,588,570 A | 12/1996 | Zirbel | |
| 5,624,008 A * | 4/1997 | Beardslee, Jr. | A63B 27/00 182/136 |
| 5,626,271 A * | 5/1997 | Messey | A47D 13/025 224/158 |
| 5,685,395 A * | 11/1997 | Nelson | A01M 31/02 182/135 |
| 5,762,243 A * | 6/1998 | McMaster | A45F 3/08 224/262 |
| 5,819,999 A | 10/1998 | Tennant | |
| 5,975,389 A * | 11/1999 | Braun | A01M 31/02 182/187 |
| 6,464,118 B2 * | 10/2002 | McUmber | A45F 3/10 224/155 |
| 6,547,110 B2 | 4/2003 | O'Hare | |
| 6,662,981 B2 * | 12/2003 | McUmber | A45F 3/10 224/155 |
| 6,772,925 B2 | 8/2004 | O'Hare | |
| 6,843,398 B2 | 1/2005 | Zion | |
| 7,021,508 B1 | 4/2006 | Aston | |
| 7,438,355 B2 * | 10/2008 | Pedemonte | A47C 1/143 297/17 |
| 9,591,924 B1 * | 3/2017 | O'Neal | A47C 7/62 |
| 2006/0081663 A1 | 4/2006 | Chiang | |
| 2009/0084821 A1 | 4/2009 | Lenzi | |

\* cited by examiner

MULTIFUNCTIONAL PACK FRAME

FIELD OF THE INVENTION

The present disclosure is in the field of multifunctional pack frames.

SUMMARY OF THE INVENTION

In various embodiments, a multifunctional pack frame is disclosed. The multifunctional pack frame includes a vertical frame and a horizontal frame. In some embodiments, the vertical frame and the horizontal frame may be connected in an angle relationship. This angle relationship between the vertical frame and the horizontal frame allows the multifunctional pack frame to function as a backrest. In one embodiment, the multifunctional pack frame allows a user to comfortably take a seated or resting position and reliably rest against the vertical frame.

In some embodiments, the vertical frame and the horizontal frame may be disposed in a fixed angle relationship. In one embodiment, the horizontal frame supports the vertical frame allowing the vertical frame to provide back support as a backrest. In one embodiment, the vertical frame and horizontal frame are removably connected in a fixed angle relationship. The horizontal frame may be connected to the vertical frame and may support the vertical frame at a fixed angle. In this manner, the vertical frame may be supported by the horizontal frame at an angle that creates support and comfort for the user when the user engages with the vertical frame of the multifunctional pack frame while in a resting or seated position.

In some embodiments, side supports may be deployed for use in compression to further provide support for the vertical frame and the user when the user is resting against the vertical frame. In one embodiment, the side supports may be connected to both the vertical frame and the horizontal frame on each side of the multifunctional pack frame.

In some embodiments, the vertical frame and the horizontal frame may be disposed in an adjustable angle relationship. In one embodiment, the horizontal frame supports the vertical frame allowing the vertical frame to provide back support as a backrest. When the vertical frame and the horizontal frame are connected, the user may comfortably take a seated position and reliably rest against the vertical frame. In one embodiment, the angle between the vertical frame and the horizontal frame may be quickly and easily adjusted by the user. Angle adjustability allows the user to select the optimum vertical frame angle to suit the user's needs and preferences at the time of use. In one embodiment, the angle of connection may be adjusted within a range to provide a maximum level of comfort for the user when engaging with the vertical frame of the multifunctional pack frame in a resting, seated, or reclining position.

In some embodiments, the vertical frame of the multifunctional frame pack may further include a vertical frame brace and the horizontal frame of the multifunctional frame pack may further include a horizontal frame brace. The vertical frame brace connects the distal ends of the vertical frame and the horizontal frame brace connects the distal ends of the horizontal frame. In one embodiment, one or both of the vertical frame brace and the horizontal frame brace are formed in a manner that creates a firearm aiming support structure.

In one embodiment, multifunctional pack frame operates as a freestanding vertical frame that includes a vertical frame brace configured to provide both vertical support and lateral support for a firearm's forend. In this manner, the vertical frame brace of the vertical frame provides firearm support for steady aiming and reducing fatigue while a user is kneeling or seated and awaiting a shot.

In one embodiment, the multifunctional pack frame may be operated with the vertical frame disposed in a horizontal position and the horizontal frame disposed in a vertical position. The horizontal frame brace of the horizontal frame provides both vertical support and lateral support for a firearm's forend. In this manner, the end brace of the horizontal frame provides firearm support for steady aiming and reducing fatigue while the user is reclining or laying on the ground and awaiting a shot.

In yet another embodiment, the multifunctional pack frame may be laid on the ground with one of the vertical side rails and one of the horizontal side rails contacting the ground surface. Notches formed along the sky-facing vertical side rail and sky-facing horizontal side rail may then be used cooperatively to support a firearm forend. In this manner, the notches of the vertical side rail and horizontal side rail of the multifunctional pack frame cooperate to provide firearm support for steady aiming and reducing fatigue while the user is engaging with the multifunctional pack frame while reclining or laying aground and awaiting a shot.

In one embodiment, the multifunctional pack frame may be utilized in combination with a pack for carrying items. Pack sizes may be varied, and packs may be constructed with a variety of pockets, openings, or other storage compartments of any number of sizes. In some embodiments, packs may include shoulder straps, waist straps, and frame connectors.

In one embodiment, the multifunctional pack frame may be utilized with a pack having a detachable cushioning pad which may be deployed for additional comfort when the user is seated, reclining, or both, against the vertical frame as a backrest. In one embodiment, the pack optionally includes a detachable sleeve or pocket for containing a seating cushion.

DETAILED DESCRIPTION OF THE INVENTION

Figure 1:
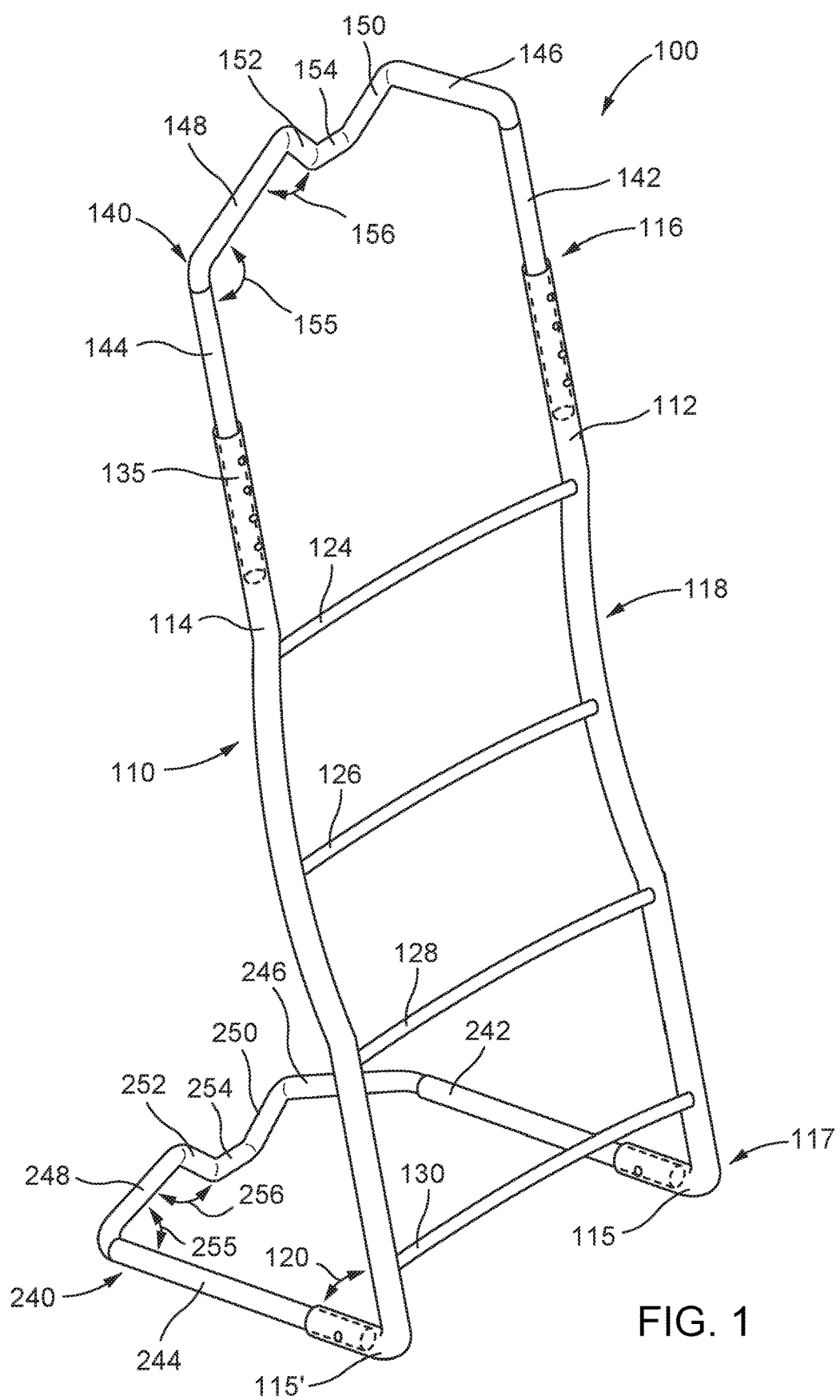
FIG. 1 is a perspective view of an embodiment of the multifunctional pack frame.

Load carrying frame structures are one of the oldest tools of humankind. Backpacks, also known as rucksacks, knapsacks, haversacks, kraxes, or simply packs, refer to arrangements to assist in the carrying of loads. Backpacks may be classified into one of four distinct general design and function types: bodypacks, frameless packs, internal frame packs, and external frame packs. While the embodiments described herein are related to improvements in an external frame backpack, the concepts described herein may be similarly embodied in an internal frame backpack.

Both internal frame packs and external frame packs include frames to assist with load weight distribution. Internal frame packs enclose the frame inside the pack bag. This arrangement allows for a large storage compartment but offers few or no lash points for attaching larger, heavy, or awkwardly sized items to the pack frame. Internal frame packs ride close to or against the user's back and often make the user uncomfortably hot because of a lack of air flow between the user and the pack. Some internal frame packs provide padding or materials designed to wick moisture away from the wearer.

In contrast, external frame packs allow for both a large storage compartment bag and provide a wide variety of lash point options for attaching items to the pack frame. External frame packs are designed to carry heavy loads. With an external frame pack, the pack is attached to the frame leaving the frame exposed above, below, and along the sides of the pack. This exposed frame area may be utilized for attaching additional gear or cargo, as needed. With an external frame pack, the pack's weight is re-directed downward towards the user's hips and legs. This arrangement makes the carrying of heavy loads more tolerable for the user.

Outdoorsmen, and in particular, hunters, favor external frame packs due to their high-load carrying capability and versatility. As used herein, the term "outdoorsmen" is used as a generic term and is meant to be inclusive of outdoorswomen. Often, outdoorsmen may hike many miles and may spend several days hiking, climbing, and camping in search of adventure and/or game. Many outdoorsmen engage in extended adventures in harsh environs such as, for example, treks above tree-line altitude, treks in difficult rocky terrain, or treks in snow or ice-covered terrain. These outdoorsmen must carry sufficient survival gear for the planned outing including environmentally appropriate clothing, food provisions, shelter provisions, and safety provisions. In addition to the survival gear utilized during these treks, outdoorsmen who are on hunting treks must also carry hunting weapons and ammunitions. Further, successful hunters will need to prepare, pack, and field haul their harvest back home. Field haul alone may weigh 100 pounds or more.

Outdoorsmen desire a frame and pack that is itself light weight yet strong enough to provide for the carrying of a variety of survival gear, adventure gear, and safety gear. Further, the frame and pack should be able to handle a substantial load increase in the event of a successful hunting trek. The frame and pack should be comfortable to the outdoorsman in use and therefore the frame should assist in redistributing the pack's weigh to the outdoorsman's hips and legs. Therefore, a multifunctional pack frame that can provide these features and additionally assist and support an outdoorsman on a trek, such as by providing a comfortable backrest in the absence of trees or other structures to lean against, is highly desirable.

Once in the wilderness a hunter may sit or crouch for long time periods with a ready firearm awaiting a shot on game. Firearms can possess considerable weight and are difficult to hold for long periods of time in a shot ready position. However, any movement, no matter how small, may alert or startle game and endanger the hunter's shot. Therefore, a multifunctional pack frame that can support a firearm by providing both vertical support and lateral support for a firearm's forend while the user is awaiting a shot and during firearm aiming is highly desirable.

Various embodiments of the multifunctional pack frame will now be described with reference to the accompanying drawings. For consistent reference, and to the extent possible, like components across the figures have been designated with the same reference numeral.

Turning to FIGS. 1-5, in one embodiment, the multifunctional pack frame has seven primary components: 1) a vertical frame; 2) a horizontal frame; 3) a fixed angle frame connecting arrangement; 4) side supports; 5) a plurality of removable component connectors; 6) a pack bag; and 7) a cushion. Each component will now be described with reference to its features and advantages as shown in the accompanying drawings.

In FIG. 1, a perspective view of the multifunctional pack frame 100 is illustrated. Reference numeral 110 refers to the vertical frame of the multifunctional pack frame 100. The vertical frame 110 serves as a pack support and attachment structure and is the component most closely aligned with a user's spine when carried by the user.

In one embodiment, the vertical frame 110 of the multifunctional pack frame 100 may be constructed of a lightweight tubular material of high strength. For example, the vertical frame 110 of the multifunctional pack frame 100 may be constructed from a lightweight metal such as tubular aluminum or tubular steel. As used herein, "tubular" is meant to encompass lengths of metals which have an open interior space and is not meant to be limiting to any particular cross-sectional profile. In one embodiment, tubular aluminum or tubular steel having a circular cross-sectional profile may be used. In one embodiment, tubular aluminum or tubular steel having an oval cross-sectional profile may be used. In one embodiment, tubular aluminum or tubular steel, having square or rectangular cross-sectional profiles may be used. In some embodiments, solid aluminum or solid steel of any cross-sectional profile may be used. In some embodiments, a combination of different materials having different tubular or solid cross-sectional profiles may be used, either alone or in combinations, in constructing one or more of the vertical frame 110 elements described herein.

Alternatively, in one embodiment, the vertical frame 110 of the multifunctional pack frame 100 may be constructed from carbon fiber materials or composite materials. In some embodiments, use of both solid and tubular carbon fiber or composites material are contemplated. The use of the term "tubular" with respect to carbon fiber or composite materials is meant to encompass lengths of materials which have an open interior space and not meant to be limiting to any particular cross-sectional profile. In one embodiment, solid carbon fiber materials or composite materials may be used.

The vertical frame 110 of the multifunctional pack frame 100 may include a number of individual components that cooperate to form the vertical frame 110. Each of the individual components that comprise the vertical frame 110 may also be manufactured from a lightweight tubular aluminum, steel, or carbon fiber material as discussed above. In one embodiment, all individual components that comprise the vertical frame 110 may be made of the same material. In one embodiment, a combination of multiple different materials may be used. For example, in one embodiment the vertical side rails 112 and 114 of the vertical frame 110, described more fully hereinbelow, may be constructed from a lightweight tubular steel and the vertical frame cross braces 124, 126, 128, and 130, also described more fully hereinbelow, may be constructed from solid or tubular carbon fiber or composite materials. Any combination of materials may be used.

The vertical frame 110 may have two parallel or substantially parallel vertical side rails illustrated at 112 and 114 of FIG. 1. In one embodiment, the vertical side rails 112 and 114 are constructed of a one-inch diameter tubular material having a 0.75 inch inside diameter. For example, the vertical side rails 112 and 114 may be constructed of steel piping commonly known as quarter-inch tubular steel, which equates to a pipe size reference of 5 and has a 0.75-inch nominal bore diameter and a 1 1/16 inch outside diameter. In other embodiments, other materials and/or other sizes may be utilized.

The vertical side rails 112 and 114 of one embodiment may have an overall length of 31 inches. However, as will be appreciated, the overall length of the vertical side rails may be varied to provide vertical frames sized for a variety of body-size users. For example, a multifunctional pack frame may be sized as "small," "medium," "large," and "extra-large," with each size having a corresponding vertical frame length. An even smaller "youth" size is contemplated. In one embodiment, a frame sized as "small" may have vertical side rails 112 and 114 of an overall length of 27 inches. In one embodiment, a frame sized as "medium" may have vertical side rails 112 and 114 of an overall length of 29 inches. In one embodiment, a frame sized "large" may have vertical side rails 112 and 114 of an overall length of 31 inches, and in one embodiment, a frame sized as "extra-large" may have vertical side rails 112 and 114 of an overall length of 33 inches. For ease of disclosure, all sizes discussed herein will be based upon a general sizing of "large" as it is contemplated that this may be the most common desired size. However, one of ordinary skill in the art will recognize that a variety of sizes are contemplated within the scope of this disclosure without detracting from the advantageous features of the multifunctional pack frame 100.

Figure 2:
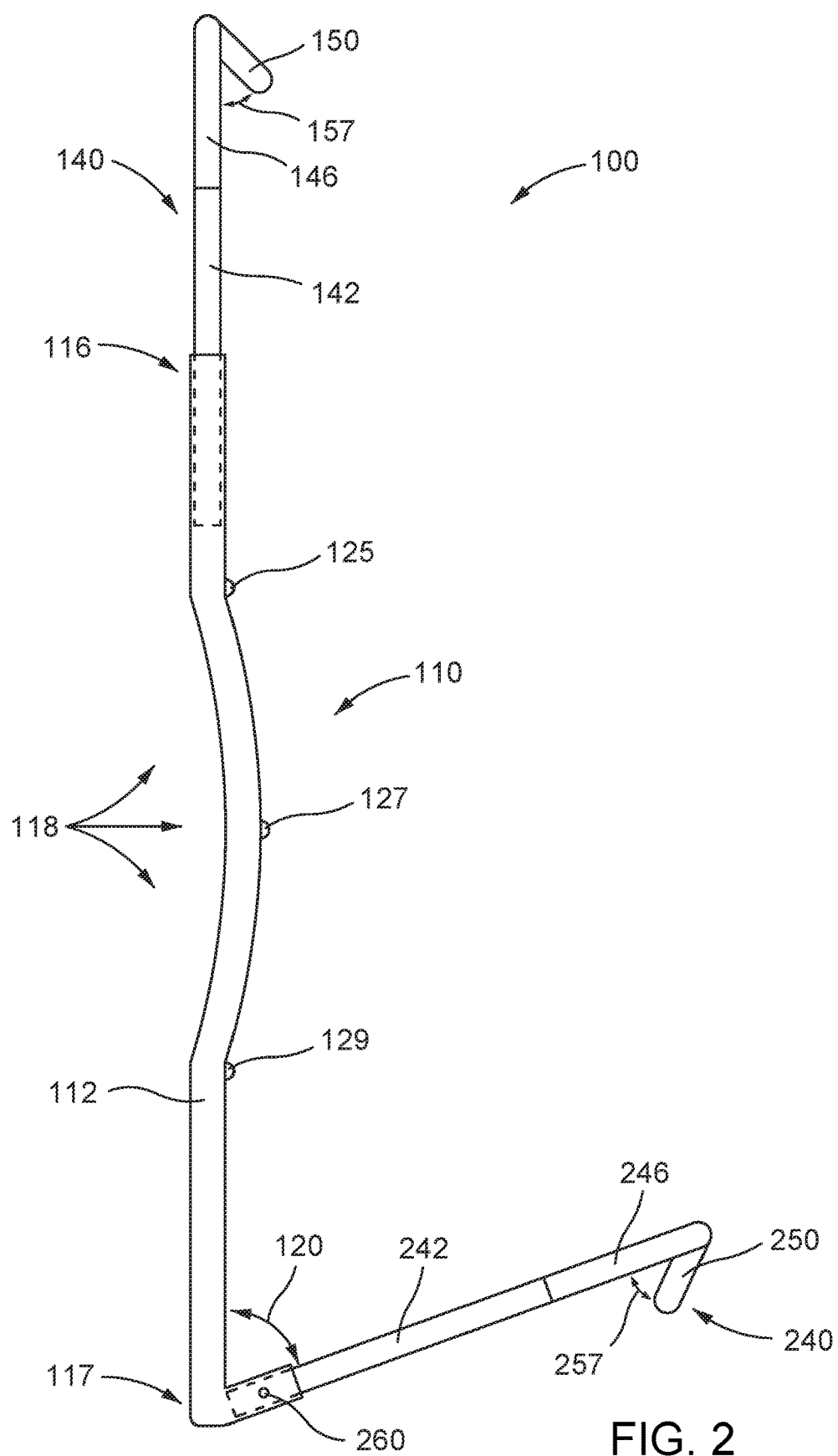
FIG. 2 is a side view of an embodiment of the multifunctional pack frame.

As shown in FIG. 2, the multifunctional pack frame 100 is illustrated in side profile, and vertical side rail 112 is shown. Starting from a distal end 116 and moving down the length of each vertical side rail 112 toward proximal end 117, in one embodiment each of the vertical side rails 112 and 114 have a curve 118. In one embodiment, curve 118 is centered approximately at the siderail midpoint and has a concavity depth in the range of one-half to one inch. Curve 118 may extend up to approximately one half of the length of each side rail. For a "large" frame having vertical side rails of an overall length of 31 inches, the curve 118 begins approximately 7 inches from the distal end 116 of side rail 112 and ends approximately 10 inches above the proximal end 117 of side rail 112. In this embodiment, the curved section has an overall length of approximately 14 inches. In other embodiments, curve 118 may be longer or shorter in length.

In one embodiment of load carrying use of multifunctional pack frame 100, curve 118 in the vertical side rails 112 and 114 is concave towards the user's body, thereby opening a small space between the vertical frame 110 and the user's spine. The curve 118 adds a measure of comfort to the user by allowing air to circulate between the user's spine and the vertical frame 110 thereby reducing heat buildup. The curve 118 also assists with advantageous pack weight distribution by slightly shifting any carried load's center of gravity away from the user's spine and thereby transferring more weight to the user's hips and legs. In one embodiment, the vertical frame 110 including curve 118 results in increased user comfort over long usage time and/or over high weight load burden.

Figure 3:
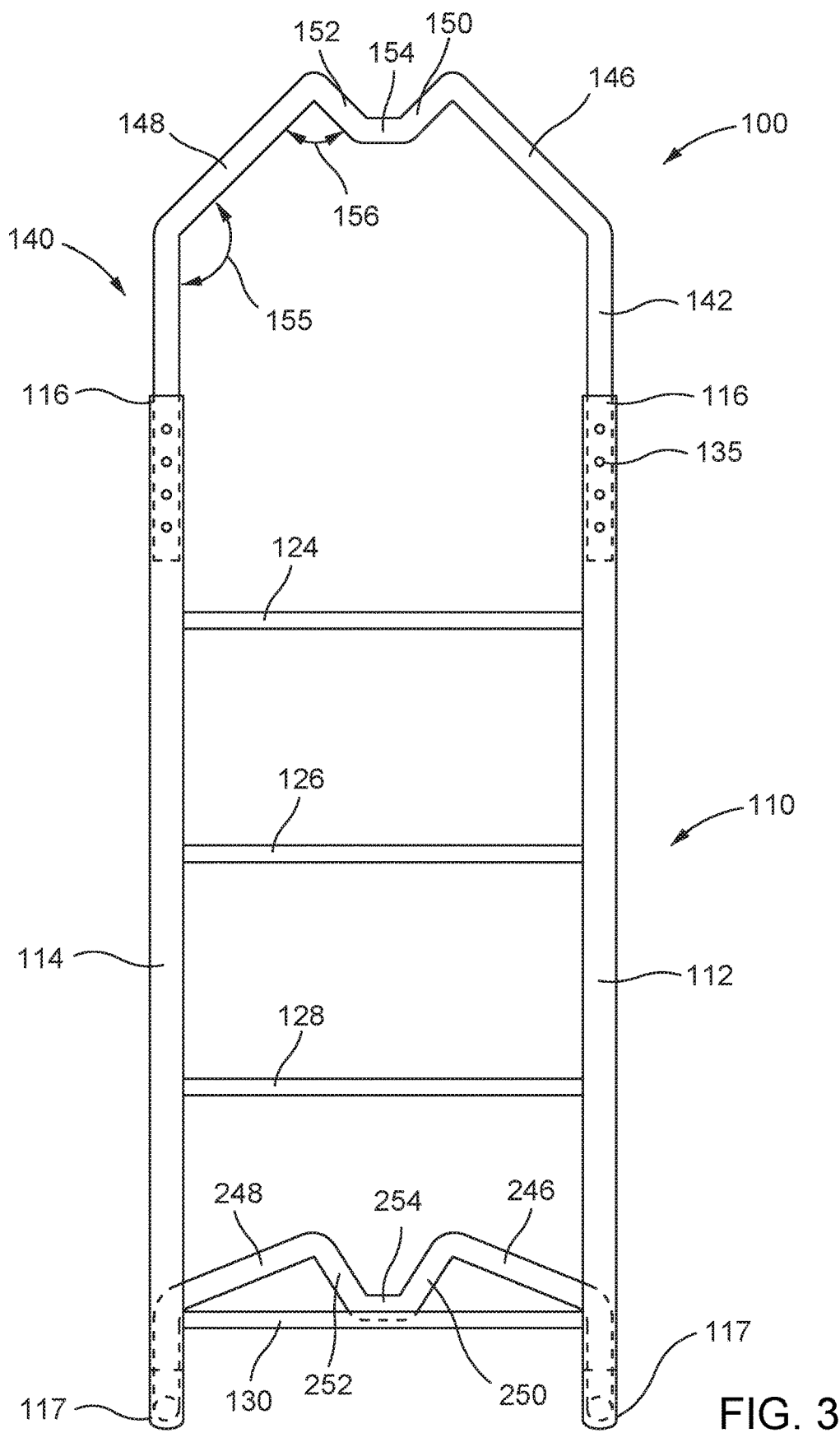
FIG. 3 is a front view of an embodiment of the multifunctional pack frame.

Turning to FIG. 3, in one embodiment, located near the distal end 116 of each of the two side rails 112 and 114 are a plurality of holes 135. Holes 135 cooperate with the vertical frame brace 140 (described in full hereinbelow) and removeable connector (not shown) (also described in full hereinbelow) to allow for repositioning of the vertical frame brace 140. Accordingly, the vertical frame brace 140 can be adjusted in position such that the vertical frame 110 may be adjusted in overall length as desired. In one embodiment, additional length of vertical frame 110 may allow for the attachment of additional gear to the vertical frame 110. Additional features and advantages of the position adjustability and the operation of holes 135 are described more fully hereinbelow in connection with the vertical frame brace 140.

Returning to FIG. 1, in one embodiment a protrusion, illustrated as 115 extending from side rail 112, and a protrusion illustrated as 115' extending from side rail 114, are locate at the proximal ends 117 of each of the vertical side rails 112 and 114. As best seen in FIG. 2, each protrusion 115 and 115' extends rearwardly and upwardly away from the back of the user at an angle 120 in the range of 65 to 75 degrees from the vertical frame. The angle 120 of protrusion 115 and the angle 120 of protrusion 115' are substantially equivalent. In one embodiment, the protrusions 115 and 115' extend at an angle 120 of 70 degrees from the vertical frame. As can be appreciated by one of ordinary skill in the art, various embodiments having different protrusion angles are possible.

In one embodiment, each protrusion may extend 2 inches to serve as a mounting point for the horizontal frame 240, where horizontal frame 240 and its attachment to vertical frame 110 are more fully described below. In another embodiment (not shown), each protrusion 115 and 115' may extend for a length of approximately 4 inches, with the outward most 3 inches of the protrusion 115 and 115' tapered to a 0.75 inch outside diameter. In such an embodiment, protrusions 115 and 115' serve as a mounting point for the horizontal frame 240 (described hereinbelow) which may attach via a friction fitting between the horizontal frame proximal ends and the tapered protrusions (not shown). In other embodiments, other suitable structures or arrangements for attachment are possible.

As illustrated in FIG. 1, the pair of vertical side rails 112 and 114 are connected by four vertical frame cross braces 124, 126, 128, and 130. In one embodiment, each of the vertical frame cross braces 124, 126, 128, and 130 are formed of the same tubular material as the vertical side rails and has an outside diameter of 0.5 inches. The vertical frame cross braces 124, 126, 128, and 130 join the vertical side rails 112 and 114 to each other. In one embodiment where the vertical side rails 112 and 114 are 31 inches in length, the vertical frame cross braces 124, 126, 128, and 130 are disposed equidistantly 7 inches apart from each other, beginning three inches from the proximal end 117 of the vertical side rails 112 and 114. However, other distribution arrangements of the vertical frame cross braces 124, 126, 128, and 130 are contemplated. For example, in one embodiment vertical frame cross brace 130 may be disposed 3.5 inches from the proximal end 117 of the vertical side rails 112 and 114, vertical frame cross brace 128 may be disposed 7.5 inches distally from vertical frame cross brace 130, vertical frame cross brace 126 may be disposed 6.5 inches distally from vertical frame cross brace 128, and finally vertical frame cross brace 124 may be disposed 5.5 inches distally from vertical frame cross brace 126.

In one embodiment, each of the vertical frame cross braces 124, 126, 128, and 130 are fixedly attached at their ends to each respective vertical side rails 112 and 114. In some embodiments, attachment may be accomplished by welding if a metal such as aluminum or steel is used. In some embodiments, attachment may be accomplished via adhesive cold welding if carbon fiber or other composite is used.

In other embodiments, each of the vertical frame cross braces 124, 126, 128, and 130 are removably attached at their ends to each respective vertical side rails 112 and 114. In some embodiments, removable attachment may be accomplished by the use of rubber plugs (not shown) inserted into the vertical frame cross brace ends and inserted into corresponding connection holes (not shown) on vertical side rails 112 and 114. As can be appreciated by one of ordinary skill in the art, other suitable attachments are possible.

Additionally, in one embodiment, at least vertical frame cross braces 124, 126, and 128 are fixedly attached at their ends to each respective vertical side rails 112 and 114 and further each vertical frame cross brace has a slight outward curve (or concavity in the direction of the user's back) across their length. These vertical frame cross braces are disposed at or near the endpoints and midpoints of the curve 118 of the vertical side rails 112 and 114. In one embodiment, the slight curvature of the vertical frame cross braces 124, 126, and 128 has a maximum concavity of 0.5 inches at the vertical frame cross brace center point. The curvature of the vertical frame cross braces 124, 126, and 128 is illustrated in the profile view of FIG. 2 as protrusions 125, 127, and 129. The curvature of the vertical frame cross braces 124, 126, and 128 illustrated by protrusions 125, 127, and 129 serve to create airflow space between the vertical frame 110 and the user's spine during load carry use of the multifunctional pack frame 100.

It is noted that in one embodiment, the length of each of the vertical frame cross braces 124, 126, 128, and 130 is approximately 12.5 inches. Thus, in one embodiment, where each vertical side rail is constructed from a one-inch diameter tubular material, the overall width of the vertical frame is 14.5 inches. As can be appreciated by one of ordinary skill in the art, any suitable length of vertical frame cross braces is possible.

Turning now to FIGS. 1, 2, and 3, the vertical frame brace 140 of the vertical frame 110 will be described. In one embodiment, vertical frame 110 is connected across the distal ends 116 of the vertical side rails 112 and 114 via a vertical frame brace 140 having a unique shape and function. In one embodiment, vertical frame brace 140 is formed of a tubular material having an outside diameter of 0.75 inches. In one embodiment, vertical frame brace 140 has a pair of distally extending side pieces illustrated as a first side piece 142 and a second side piece 144 which are cooperatively inserted into the distal end 116 openings of vertical side rails 112 and 114, respectively. Each of downwardly extending side piece 142 and 144 has a position adjustment hole (not shown). In one embodiment, when the side pieces 142 and 144 are inserted into distal end 116 openings of vertical side rails 112 and 114, the respective position adjustment holes (not shown) cooperatively align with one of the respective holes 135 located near the distal end 116 of each vertical side rail 112 and 114. When the holes align, vertical frame brace 140 and vertical frame 110 may be connected as described below.

In one embodiment, the holes 135 may be spaced 0.5 inch apart beginning 1 inch from distal end 116 and may be 0.25 inches in diameter. The position adjustment hole (not shown) that is disposed on the side pieces 142 and 144 of vertical frame brace 140 may be disposed 2 inches from the distal end of each side piece 142 and 144 and may be 0.25 inch in diameter. The distally extending side pieces 142 and 144 may have a length of 8 inches. In one embodiment, holes 135 of the vertical frame 110 and position adjustment hole (not shown) of vertical frame brace 140 may be formed in a direction perpendicular to a plane formed by vertical side rails 112 and 114. In another one embodiment, holes 135 of the vertical frame 110 and position adjustment hole (not shown) of vertical frame brace 140 may be drilled in a direction parallel to a plane formed by vertical side rails 112 and 114.

In one embodiment, vertical frame brace 140 may be connected to vertical frame 110 via any suitable removeable connectors (not shown). In one embodiment, a clevis bolt (not shown) may be inserted through the aligned holes of vertical frame brace 140 and vertical frame 110 to affix a desired position of the vertical frame brace 140 and the vertical frame 110 relative to each other. The clevis bolt may be locked into place via a cotter pin (also not shown). In other embodiments, other suitable locking pin structures may be used. In one embodiment, the vertical frame brace 140 may be adjusted in position relative to vertical frame 110 such that the overall length of multifunctional pack frame 100 may be increased or decreased as desired. Further, in some embodiments, it may be desirable to remove the vertical frame brace 140 entirely from the vertical frame 110. With the disclosed connection arrangement, removal of vertical frame brace 140 may be easily accomplished. Details of the clevis bolt and cotter pin connector arrangement are described hereinbelow.

Although one embodiment is described utilizing the clevis bolt and cotter pin arrangement for securing the vertical frame brace 140 in place across the distal ends of vertical side rails 112 and 114, other connection arrangements may be used. In one embodiment, a spring pin arrangement may function substantially equivalently. In this embodiment, the spring-loaded pins (not shown) may be mounted inside each one of the distally extending side pieces 142 and 144, with the pins extending outwardly through one of the position adjustment holes (not shown). The spring-loaded pins may then be depressed inward as the side pieces 142 and 144 are inserted into the vertical side rails 112 and 114. After insertion, when the spring-loaded pins cooperatively align with one of the respective holes 135 of the distal end of each one of vertical side rails 112 and 114 of vertical frame 110, the spring-loaded pins may extend through holes 135 and lock the vertical frame brace 140 in secure connection with the vertical frame 110 at the desired position. The vertical frame brace position may be easily adjusted by depressing the pins (thereby compressing the internal spring—not shown), adjusting the respective position of the adjustment hole (not shown) and holes 135 alignment, and allowing the pins to extend (a decompression of the internal spring) into the new position.

In one embodiment, the uppermost portion of the vertical frame brace 140 comprises a combination of five lengths of bent or formed tubular material, such as steel, aluminum, carbon fiber, or composites as discussed hereinabove, that cooperate to form a complex "M" shaped arrangement when viewed from the front as in FIG. 3. A first pair of lengths of tubular material 146 and 148 extend inwardly at an angle from the respective side pieces 142 and 144 described above. As can be seen from the side view of FIG. 2, the first pair of lengths of tubular material 146 and 148 are in the same plane as the side pieces 142 and 144, and also in the same plane as the vertical side rails 112 and 114. Further, the first pair of lengths of tubular material 146 and 148 extend inwardly from side pieces 142 and 144 in a vertical direction at an angle 155, where the angle 155 may be between 125 degrees and 145 degrees. In one embodiment, angle 155 may be 135 degrees, as is illustrated in FIG. 3.

Returning to the view of FIG. 3, in one embodiment a second pair of lengths of tubular material 150 and 152 extend from first pair of lengths of tubular material 146 and 148. Lengths of tubular material 150 and 152 extend downwardly in a horizontal direction and towards each other at a second angle 156. In the embodiment of FIG. 3, second angle 156 is 90 degrees. The second pair of lengths of tubular material 150 and 152 also extend rearwardly (away from the user, when the multifunctional pack frame 100 is in use) at a third angle 157 from the plane of vertical frame brace 140 when viewed in a side view as is shown in FIG. 2. In one embodiment, third angle 157 is approximately 45 degrees. However, it will be appreciated by one of ordinary skill in the art that in other embodiments of the vertical frame brace 140, different angle values for 155, 156, and 157 may be selected.

Continuing with reference to FIG. 3, in one embodiment a third length of tubular material 154 extends horizontally between the second pair of lengths of tubular material 150 and 152 and connects the second pair of lengths of tubular material 150 and 152. This third length of tubular material 154 of tubular material may be one inch long on the top horizontal surface and 2 inches long on the lower horizontal surface. However, in different embodiments where different first and second pairs of lengths of tubular materials and different angles are used, third length of tubular material 154 may be longer or shorter. As can be seen from viewing FIGS. 1-3 in combination, the first pair of lengths of tubular material 146 and 148, second pair of lengths of tubular material 150 and 152, and third length of tubular material 154 cooperate in a combined upward and rearward direction to form a complex "M" shaped arrangement having a narrow horizontal surface at the center point of the vertical frame brace 140 arrangement.

Although the third length of tubular material 154 has been illustrated as a horizontal length of tubular material thereby providing an "M" like shaped arrangement, in other embodiments the described third length of tubular material could be omitted and the second pair of lengths of tubular material 150 and 152 maybe extended further in the downward angled direction so as to join at a sharp "V" like shaped arrangement. Alternatively, in other embodiments, the second pair of lengths of tubular material 150 and 152 could be curved and joined smoothly together to form a "U" like shaped arrangement in the center of vertical frame brace 140. Regardless of arrangement shape, the vertical frame brace may have an indentation that is of a sufficient depth to receive and support a firearm forend and to provide a measure of forend lateral side support when the firearm is resting in the indentation.

Figure 4:
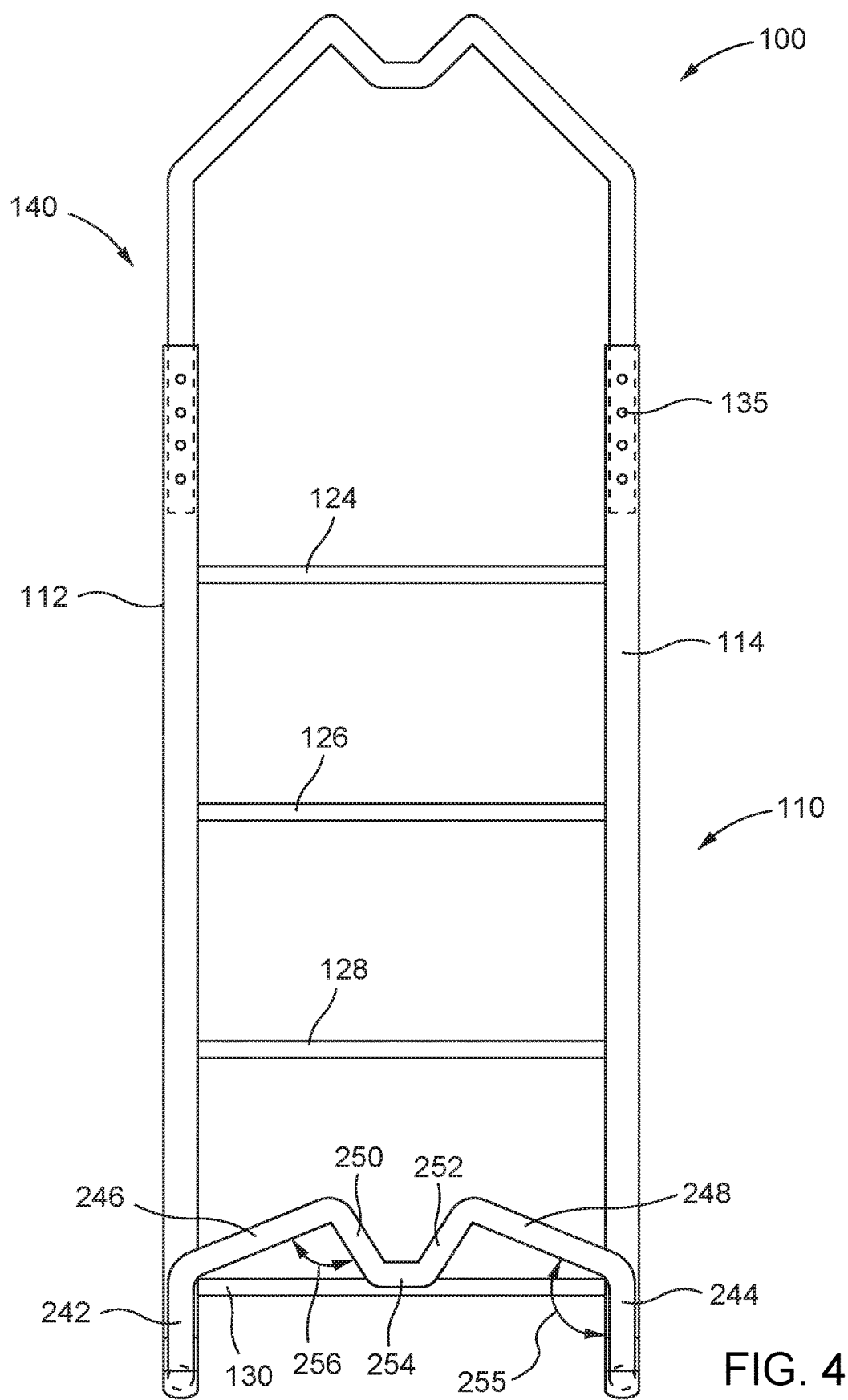
FIG. 4 is a back view of an embodiment of the multifunctional pack frame.

Turning now to FIGS. 1 and 4, the second major component of one embodiment of the multifunctional pack frame 100, a horizontal frame 240, will be described. Extending rearwardly from the lower end of the vertical frame 110 is the horizontal frame 240. In one embodiment, the horizontal frame 240 is detachably attached to the fixed angle protrusions 115 and 115' at the proximal ends of vertical side rails 112 and 114 of vertical frame 110 described above.

Like the vertical frame 110 and vertical frame brace 140, the horizontal frame 240 is constructed of a lightweight tubular material of high strength. For example, the horizontal frame 240 of the multifunctional pack frame 100 may be constructed from a lightweight metal such as tubular aluminum or steel. As used herein, "tubular" steel is meant to encompass lengths of metals which have an open interior space and not meant to be limiting to any particular cross-sectional profile. In one embodiment, tubular aluminum or tubular steel having a circular cross-sectional profile may be used. In one embodiment, tubular aluminum or tubular steel having an oval cross-sectional profile may be used. In one embodiment, tubular aluminum or tubular steel, having square or rectangular cross-sectional profiles may be used. In some embodiments, solid aluminum or solid steel of any cross-sectional profile may be used. In some embodiments, a combination of different materials having different tubular or solid cross-sectional profiles may be used, either alone or in combinations, in constructing one or more of the horizontal frame 240 elements described herein.

Alternatively, the horizontal frame 240 of the multifunctional pack frame 100 may be constructed from carbon fiber materials or composite materials. In some embodiments, use of both solid and tubular carbon fiber or composites material are contemplated. The use of the term "tubular" with respect to carbon fiber or composite materials is meant to encompass lengths of materials which have an open interior space and not meant to be limiting to any particular cross-sectional profile. In one embodiment, solid carbon fiber materials or composite materials may be used.

The horizontal frame 240 has two parallel or substantially parallel horizontal side rails illustrated at 242 and 244 of FIG. 1. In an exemplary embodiment, the horizontal side rails 242 and 244 are constructed of a 0.75-inch outside diameter tubular material that will allow insertion of the horizontal side rails 242 and 244 into protrusions 115 and 115' at the proximal ends 117 of the vertical side rails 112 and 114, respectively, and discussed more fully hereinbelow.

The horizontal side rails 242 and 244 are, in one embodiment, connected to each other by a bracing structural arrangement that may include a firearm support arrangement similar to the vertical frame brace 140 of the vertical frame 110 described above. However, in use, this second firearm support arrangement operates at a lower height position than the arrangement previously described. The height in use distinction will be made clear hereinbelow with the description of the respective structures in use.

In one embodiment, the structural arrangement connecting the distal ends of horizontal side rails 242 and 244 of horizontal frame 240 may comprise a combination of five lengths of bent or formed tubular material that cooperate to form a complex "M" shaped arrangement when viewed from the rear as in FIG. 4. In one embodiment, the "M" shaped arrangement of the horizontal frame 240 is similar to the "M" shaped arrangement of the vertical frame brace 140 discussed above. As can be seen in FIGS. 3 and 4, a fourth pair of lengths of tubular material 246 and 248 extend rearwardly and inwardly from the respective horizontal side rails 242 and 244 described above. As can be seen from the side view of FIG. 2, these fourth pair of lengths of tubular material 246 and 248 are in the same plane as the horizontal side rails 242 and 244. In a manner similar to the first pair of lengths of tubular material 146 and 148 of the vertical frame brace 140, the fourth pair of lengths of tubular material 246 and 248 extend inwardly in a planar direction at fourth angle 255, where the fourth angle 255 may be between 125 degrees and 145 degrees. In one embodiment, fourth angle 255 may be approximately 135 degrees, as illustrated in FIG. 1.

Returning to the view of FIGS. 3 and 4, a fifth pair of lengths of tubular material 250 and 252 extend from fourth pair of lengths of tubular material 146 and 148. Fifth pair of lengths of tubular material 250 and 252 extend downwardly in a horizontal direction and towards each other at a fifth angle 256. In the illustrated embodiment of FIGS. 3 and 4, fifth angle 256 is 90 degrees. The fifth pair of lengths of tubular material 250 and 252 also extend downwardly (away from the plane of the horizontal frame, when the pack frame is in use) at a sixth angle 257 as illustrated in side view in FIG. 2. In one embodiment, sixth angle 257 is 45 degrees. However, it will be appreciated by one of ordinary skill in the art that in other embodiments of the horizontal frame 240, different values for angles 255, 256, and 257 may be selected.

In one embodiment, a sixth length of tubular material of tubular material 254 extends horizontally and connects the fifth pair of lengths of tubular material 250 and 252. In one embodiment, this sixth length of tubular material 254 may be approximately one inch long on the upper horizontal surface and approximately 2 inches long on the lower horizontal surface. However, in different embodiments where different first and second pairs of lengths of tubular material and different angles are used, third length of tubular material 154 may be longer or shorter. As can be seen from viewing FIGS. 1-4 in combination, the fourth pair of lengths of tubular material 246 and 248, fifth pair of lengths of tubular material 250 and 252, and sixth length of tubular material 254 of bent or formed tubular material cooperate in a combined shape to form a complex "M" shaped arrangement having a narrow horizontal surface at the center point of the horizontal frame 240 arrangement.

Although the sixth length of tubular material 254 of tubular material has been illustrated as a horizontal length of tubular material thereby providing an "M" like shaped arrangement, in other embodiments the described length of tubular material 254 could be omitted and the fifth pair of lengths of tubular material 250 and 252 may extend further in the downward angled direction so as to join at a sharp "V" like shaped arrangement. Alternatively, in other embodiments, the fifth pair of lengths of tubular material 250 and 252 may be curved and joined smoothly together to form a "U" like shaped arrangement in the center of horizontal frame 240. Regardless of arrangement shape, horizontal frame 240 may have an indentation that is of a sufficient depth to receive and support a firearm forend and to provide a measure of forend lateral side support.

As can be appreciated from the above discussions, in one embodiment the lengths of tubular material and angular relationships between the cooperating lengths of tubular material forming the shaped arrangements joining the side pieces 142 and 144 of vertical frame brace 140 and joining horizontal side rails 242 and 244 of horizontal frame 240 are similar. In other embodiments, the lengths of tubular material and angular relationships between the cooperating lengths of tubular material forming the shaped arrangements joining the side pieces 142 and 144 of vertical frame brace 140 may be different from the lengths of tubular material and angular arrangements of the cooperating lengths of tubular material forming the shaped arrangements joining horizontal side rails 242 and 244 of horizontal frame 240.

In one embodiment, the horizontal frame 240 may have an overall length of 14 inches, inclusive of fifth pair of lengths of tubular material 250 and 252, and sixth length of tubular material 254. In other embodiments, the length of horizontal frame 240 may be longer or shorter. In one embodiment, the width of the horizontal frame 240 is substantially the same as the width of vertical frame 110 to facilitate attachment of the frames.

In one embodiment, attachment of each of the horizontal side rails 242 and 244 of the horizontal frame 240 to the respective protrusions 115 and 115' of each of vertical side rails 112 and 114 of the vertical frame 110 may be accomplished via inserting the distal end portions of horizontal side rails 242 and 244 into the protrusions 115 and 115' and aligning up attachment holes 260 in each respective fixed angle protrusions 115 and 115' and horizontal side rails 242 and 244. In one embodiment, a clevis bolts (not shown) may be inserted through the aligned attachment holes 260 and locked into place with cotter pins (not shown) in order to securely connect the horizontal frame 240 to the vertical frame 110. Details of the clevis bolt and cotter pin connector arrangement are described hereinbelow.

In one embodiment, the pair of fixed angle protrusions 115 and 115' may extend approximately three inches in length and attachment holes 260 may be formed approximately 1.5 inches from the distal end of each protrusion. Similarly, the attachment holes 260 of each of the horizontal side rails 242 and 244 of the horizontal frame 240 are formed approximately 1.5 inches from the distal ends. Thus, in this embodiment, three inches of the respective fixed angle protrusions 115 and 115' of vertical frame 110 overlaps approximately three inches of the distal ends of horizontal side rails 242 and 244 of the horizontal frame 240. The connection of the two tubular steel frame pieces may then be secured by inserting a clevis bolt (not shown) through attachment holes 260 and securing the clevis bolt in place with a cotter pin (not shown).

Although one embodiment is described utilizing a clevis bolt/cotter pin arrangement for locking the horizontal frame 240 to the vertical frame 110 in a fixed-angle relationship, other connection arrangements may be used. For example, in one embodiment a spring pin arrangement may be used. In one such embodiment, spring-loaded pins may be mounted inside the horizontal side rails 242 and 244 of the horizontal frame 240 with the pins extending outwardly. To secure frame pieces, the pins may be depressed inward as the horizontal side rails 242 and 244 are inserted into the respective fixed angle protrusions 115 and 115' of vertical frame 110. When the depressed pins cooperatively align with one of the respective attachment holes 260 of the respective fixed angle protrusions 115 and 115', the pins may extend through attachment holes 260 to securely lock the horizontal frame 240 and the vertical frame 110 together.

Figure 5:
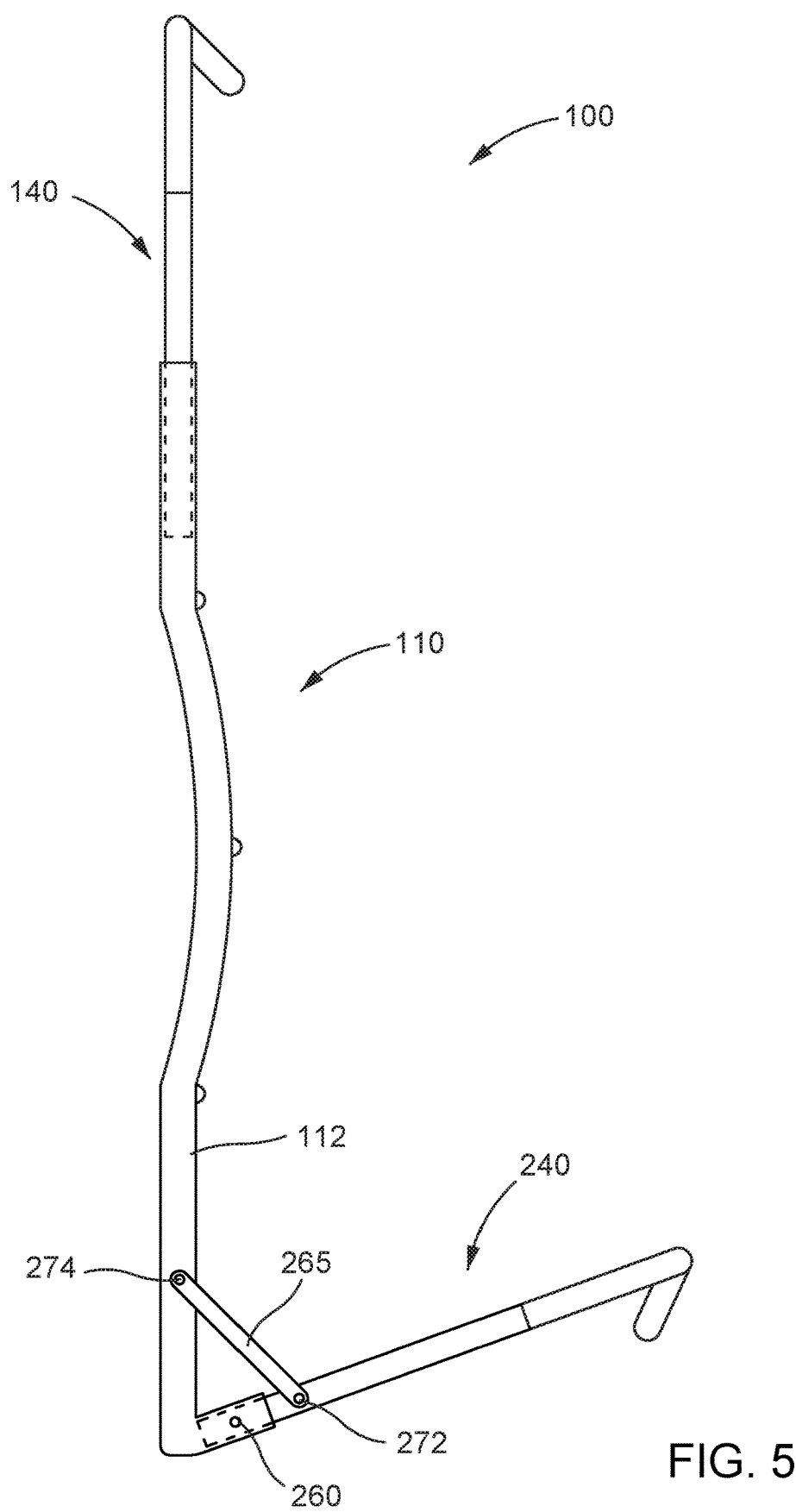
FIG. 5 is a side view of an embodiment of the multifunctional pack frame including a side support.

As illustrated in FIG. 5, in one embodiment the connection between the horizontal frame 240 and the vertical frame 110 may be further trussed and supported by the addition of a pair of side supports 265 and 270 (not shown). The side supports 265 and 270 provide reinforcement and compression support of the vertical frame 110 when the multifunctional pack frame 100 is supported by the horizontal frame 240 for use as a backrest. In other embodiments, the side supports 265 and 270 provide reinforcement and compression support of the vertical frame 110 when the multifunctional pack frame 100 is supported by the horizontal frame 240 for use in a high or low firearm support position (as described more fully hereinbelow).

Referring to FIG. 5, the side supports 265 and 270 (not shown) may be constructed, in one embodiment, of solid steel and may be identically sized and shaped. In some embodiments, the side supports 265 and 270 may be constructed from carbon fiber reinforced material. The side supports 265 and 270 may be 6.5 inches in length and may have a centrally disposed 0.25-inch hole located on each side support end approximately 0.5 inches from the end edge. In one embodiment, all edges of the side supports 265 and 270 are rounded so that no sharp, hard edges are exposed.

In one embodiment, the side supports 265 and 270 may attach on the outside edges of the horizontal frame 240 and vertical frame 110 when connected as illustrated in FIG. 5. Quarter inch connection holes may be drilled in suitable predetermined locations along the sides of both the vertical frame 110 and the horizontal frame 240 to facilitate the attachment of the side supports 265 and 270. In one embodiment, the side supports 265 and 270 are attached by component connectors such as the previously mention clevis bolt (not shown) and cotter pin (not shown) arrangement, which will now be described.

In one embodiment, the component connectors utilized throughout the multifunctional pack frame 100 may be uniform in size and operation to provide interchangeability and reconfiguration of components in a quick and uniform manner. The component connectors must also be strong. Cotter pin (not shown) and clevis bolt (not shown) arrangements are suitable as they provide ease of use, meet the strength requirements, and may be uniformly sized. In one embodiment, clevis bolts may be made of solid steel. In one embodiment, a clevis bolt of 1.25-inch length, 0.25-inch shank, and 0.375-inch head may be sufficient in size and strength to perform all frame connection requirements. In other embodiments, another suitably sized clevis bold may be utilized. In one embodiment, all component connection holes are sized to accommodate the diameter of the utilized clevis bolt. Thus, in one embodiment, all connection holes may be 0.25 inches in diameter. However, other hole diameters are possible if other clevis bolt diameters are utilized.

Once inserted through connection holes, clevis bolts will be secured or locked into place by cotter pins (not shown). In one embodiment, cotter pins may be identically sized and manufactured from steel. In some embodiments, the cotter pins may be of the "hairpin" or "R" clip type, and cotter pins of a 2-inch length may securely hold the clevis bolts in place. In some embodiments, "circle" cotter rings (not shown) may be used. This clevis bolt and cotter pin arrangement is advantageous because of the ease with which the pins and bolts may be removed thereby allowing for easy and fast reconfiguration of component parts of the multifunctional pack frame 100 in the field. Further, a plurality of bolts and pins may easily be transported in a small pocket located on the pack bag.

Figure 6:
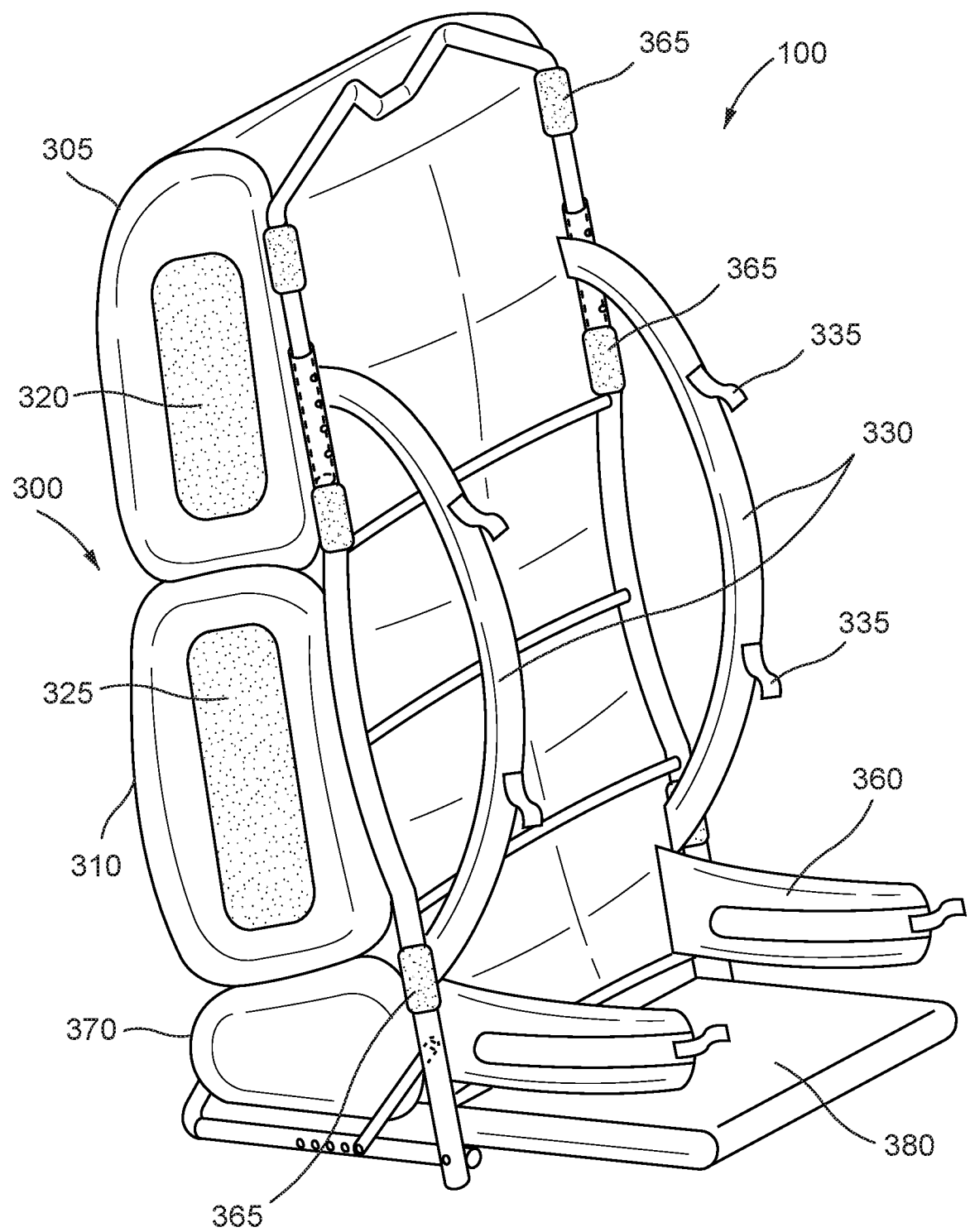
FIG. 6 is a perspective view of another embodiment of the multifunctional pack frame in combination with a pack bag.
Figure 7:
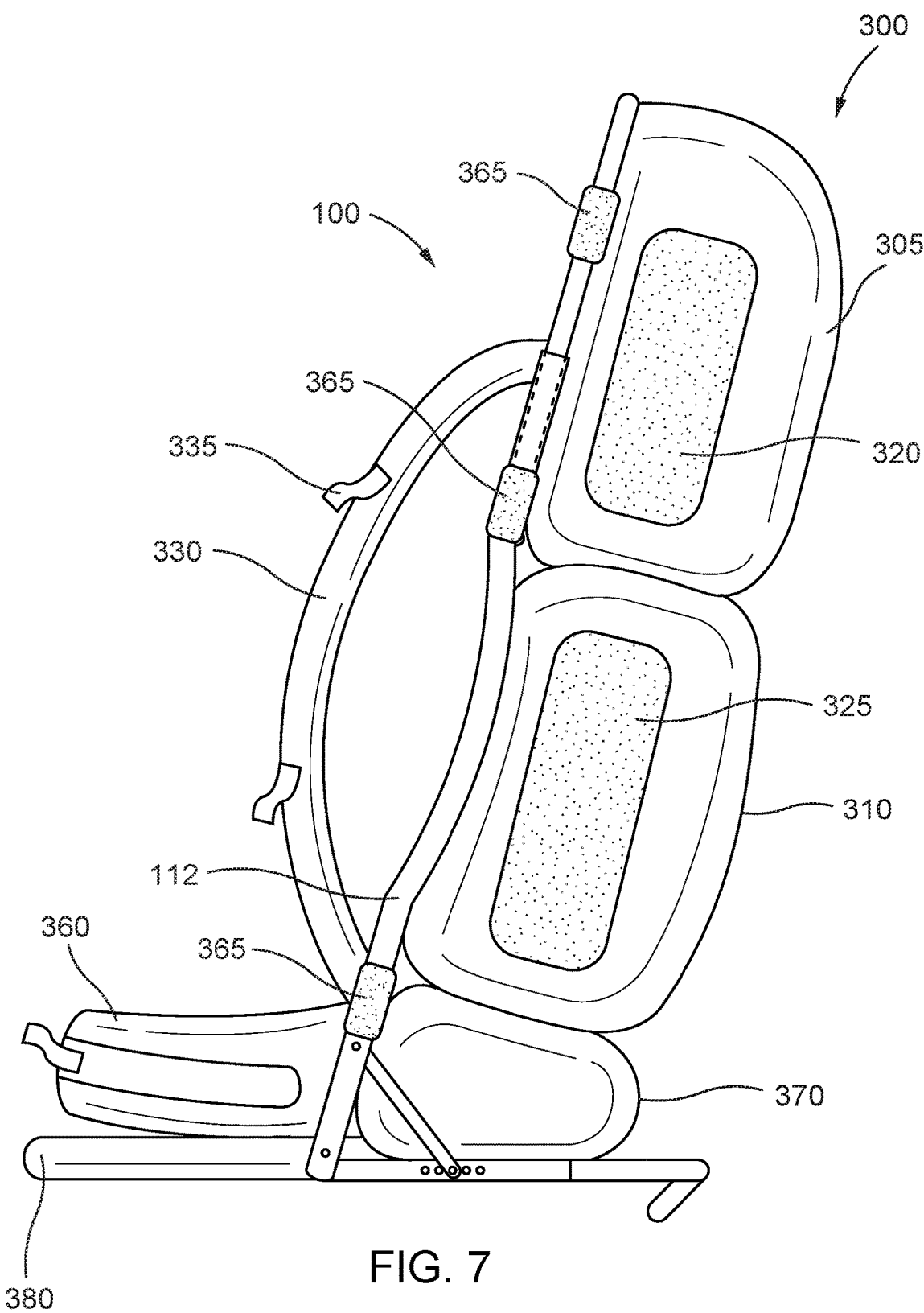
FIG. 7 is a side view of another embodiment of the multifunctional pack frame in combination with a pack bag.

Turning now to FIGS. 6 and 7, an embodiment of a pack bag 300 is illustrated in combination with an embodiment of the multifunctional pack frame 100 having an adjustable angle connection between horizontal frame 240 and vertical frame 110. Further details of an adjustable angle connection embodiment of the multifunctional pack frame 100 are discussed hereinbelow with respect to FIGS. 10 and 11.

In one embodiment, the pack bag 300 may be constructed of any suitable fabric or material and may be available in a plurality of sizes and configurations. For example, in one embodiment, a "light" pack may be a pack capable of holding 1,500 cubic inches of gear. In another embodiment, a "camping" pack may be a pack capable of holding 7,000 cubic inches of gear. In other embodiments, a variety of additional pack "types" or sizes may be available and utilized with the multifunctional pack frame 100.

In one embodiment, pack bag 300 may have one or more sealable compartments of varying sizes. As illustrated in FIGS. 6 and 7, pack bag 300 may have a first compartment 305 and a second compartment 310. In other embodiments, the pack bag 300 may have a fewer number of compartments or a greater number of compartments. Pack bag 300 compartments 305 and 310 may be accessible via openings (not shown) which may be sealed by any suitable closure. For example, one or more compartments may be sealed by waterproof zippers or securable flaps or the like as appropriate.

In one embodiment, pack bag 300 may have one or more external pockets, generally illustrated in FIG. 6 as a first pocket 320 and a second pocket 325. Alternatively, or additionally, in one embodiment, pack bag 300 may include one or more or internal pockets (not shown). Pockets 320 and 325 may be sealed by waterproof zippers or securable flaps or the like, as appropriate. In some embodiments, pockets may be distributed over the sides and rear face of a pack bag 300. Additionally, in some embodiments, the pack bag 300 may include an elastic cord lacing area (not shown) or an elastic cord netting area (not shown) for fast and secure attachment and holding of carried items. In some embodiments, structures such as loops and/or gear pockets (not shown) may be included on the outside surfaces of pack bag 300 for securely attaching hunting and/or fishing gear to the outside surfaces of the pack bag 300.

In one embodiment, the pack bag 300 may have a single main compartment having a drawstring opening (not shown) at the in-use vertical top end of the pack bag. The opening may be covered by a fold-over flap (not shown) that securely fastens to the outside of the pack bag 300. However, other pack bag closure arrangements such as a waterproof zipper (not shown) may alternatively provide closure for the pack bag 300 main compartment. In some embodiments, the pack bag 300 may be manufactured from a lightweight, high strength, waterproof cloth material and may include features such as compression straps (not shown) or "daisy chain" loops (not shown) for gear lashing such as, for example, attaching trekking poles.

As shown in FIGS. 6 and 7, in one embodiment the pack bag 300 may have attached thereto a shoulder harness 330 utilized for carrying the multifunctional pack frame 100 by a user. The shoulder harness 330 may be well padded and adjustable in length. Shoulder harness 330 may also have one or more pairs of sternum straps 335 for securing the multifunctional pack frame 100 to the user's body during use. Additionally, the pack bag 300 may have attached thereto a well-padded, adjustable hip belt 360. For convenience, some embodiments of the hip belt 360 may include one or more pockets (not shown) or lashing elastics (not shown) for carrying additional gear such as gloves, water bottles, or other small gear that may require quick access.

The pack bag 300 may be, in some embodiments, attached to vertical frame 110 via releasable attachment straps 365 such as heavy-duty hook and loop straps. Releasable attachment straps 365 may be located at a variety of positions along the pack bag 300 edges and suitable points for attachment to vertical frame 110. In some embodiments, other suitable attachment arrangements such as compression straps or bolt and pin arrangements may be utilized for attaching the pack bag 300 to vertical frame 110. The use of releasable attachment straps 365 ensures that the pack bag can be easily separated from or attached to the multifunctional frame.

In one embodiment, a sleeve 370 may be attached at the lowermost end of the pack bag 300. Sleeve 370 may be constructed of a heavyweight waterproof fabric or material. Sleeve 370 may be attached to the pack bag 300 via heavy duty hook and loop fasteners to the pack bag and may fold into a lower surface of the pack where it is also held in place with heavy duty hook and loop fastener. In other embodiments, sleeve 370 may be attached to the proximal ends 117 of vertical side rails 112 and 114 of vertical frame 110 or sleeve 370 may be attached to vertical frame cross brace 130. In one embodiment, the fabric sleeve may be approximately 16 inches in length and 14 inches in width.

The fabric sleeve may contain a cushion 380 of 14-inch length and 12-inch width. Cushion 380 may be constructed of foam that ranges in thickness from approximately 0.25 inches-0.5 inches. In one embodiment, cushion 380 may be rolled, folded, or otherwise contained within sleeve 370 in a manner that allows deployment in a forward horizontal direction. In this manner, a convenient seating surface may be deployed from the lower pack frame and pack bag area. In one embodiment, sleeve 370 and cushion 380 may be integral with pack bag 300. In one embodiment, sleeve 370 and cushion 380 may be wholly separable from pack bag 300 and multifunctional pack frame 100.

As can be appreciated, the multifunctional pack frame 100 described above may enable any user, for example, an outdoorsman, a backpacking enthusiast, a hiker, a camper, a fisherman, or a casual backpack user, to have a seat with a backrest at any location the user desires. In one embodiment, when the user desires a back rest, the user may remove the multifunctional pack frame 100 from his back and, if not previously deployed, attach the horizontal frame 240 and side supports 265 and 270 to the vertical frame 110 as described above. The multifunctional pack frame 100 may then be placed upon the ground. Further, in some embodiments the user may open the sleeve 370 and deploy the cushion 380 (described more fully hereinbelow) from the lower portion of the pack bag 300 and direct the cushion 380 in the forward direction towards the user's body. The user may then comfortably sit on the deployed cushion 380 while using the vertical frame 110, now supported at a comfortable angle by the horizontal frame 240 and side supports 265 and 270, as a backrest. The horizontal frame 240 provides vertical frame 110 support, and side supports 272 and 274 act in compression to support vertical frame 110 and to act as a stabilizer for the pressure of the user's back resting upon the vertical frame 110.

Figure 8:
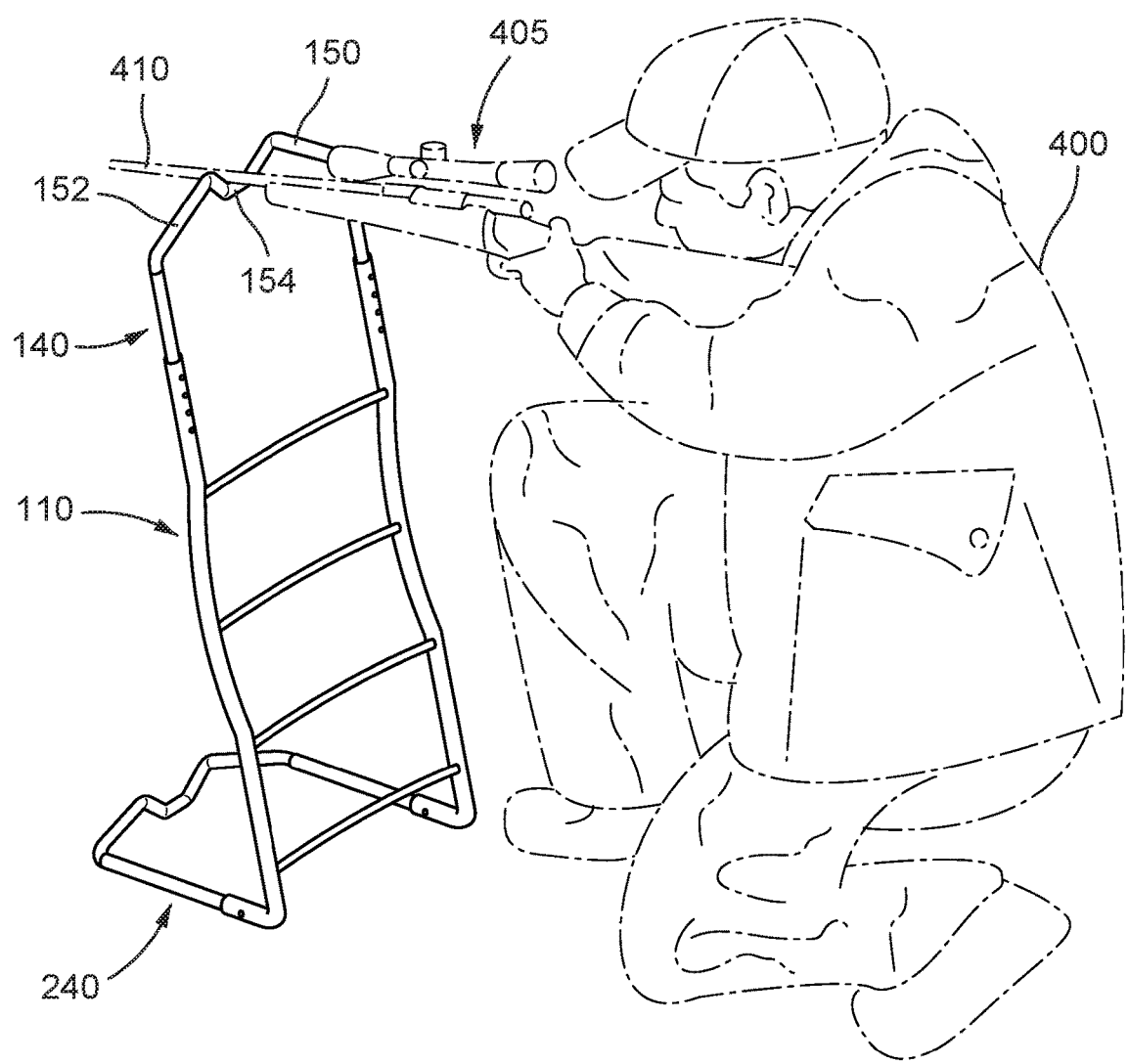
FIG. 8 is a perspective view of an embodiment of the multifunctional pack frame in use as a firearm support.
Figure 9:
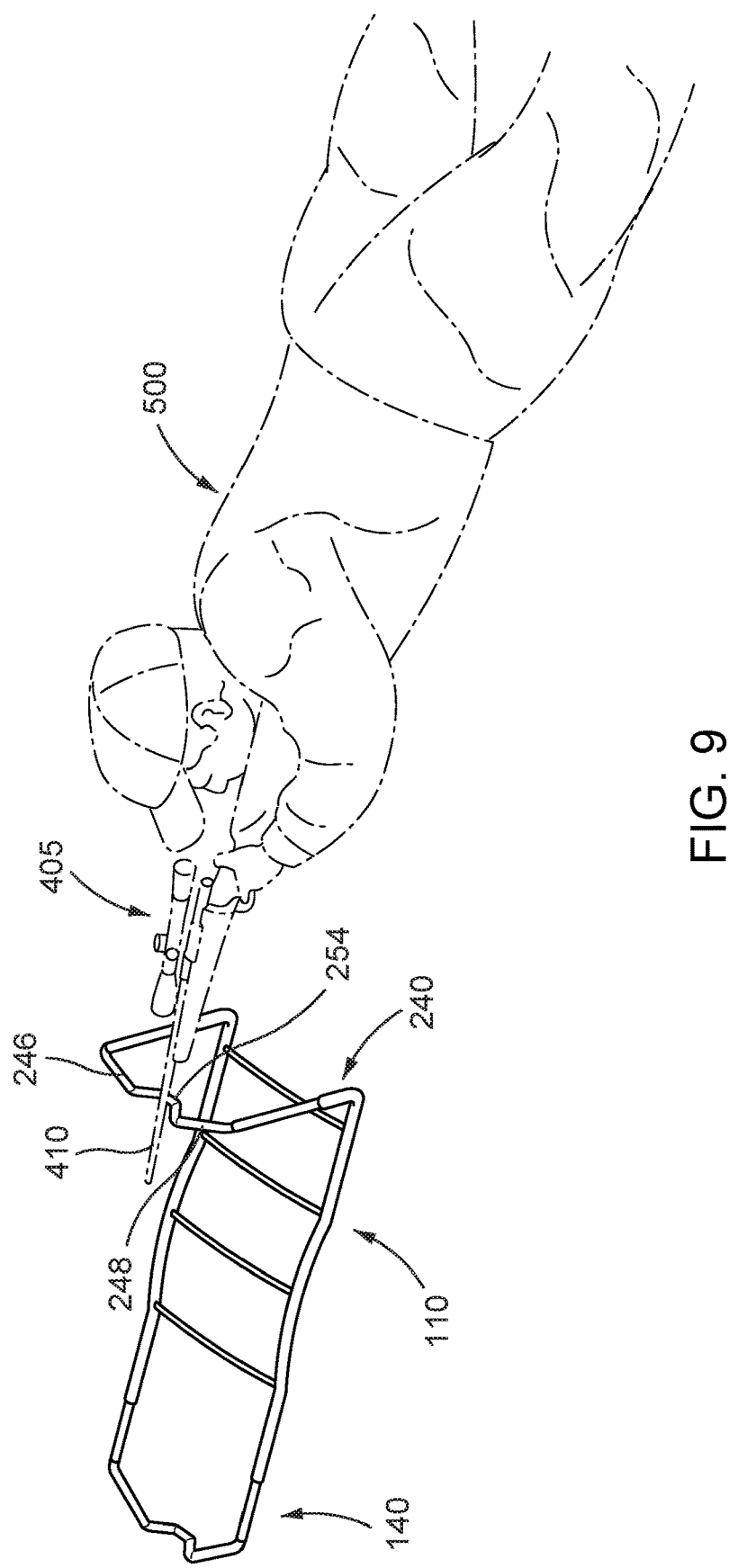
FIG. 9 is a perspective view of another embodiment of the multifunctional pack frame in use as a firearm support.

Turning to FIGS. 8 and 9, use of the multifunctional pack frame 100 as a firearm support will now be described. FIG. 8 illustrates one such firearm support embodiment of the multifunctional pack frame 100 where the vertical frame brace 140 forms an "M" like shaped arrangement (described above) that is used to support a firearm forend 410. In one embodiment, outdoorsman 400 may kneel, crouch, or sit with the multifunctional pack frame 100 free standing in front of the outdoorsman 400 as illustrated in FIG. 8. In one embodiment, pack bag 300 has been removed from multifunctional pack frame 100 when the multifunctional pack frame is utilized as a firearm support. In other embodiments, pack bag 300 may still be attached to multifunctional pack frame 100 but may contain no or minimal gear. For example, after outdoorsman has deployed pack bag cargo to establish camp, the pack bag contents will be minimal. In one embodiment, the multifunctional pack frame 100 may be used as a firearm support with a full pack bag 300 attached thereto.

In firearm support use, the multifunctional pack frame 100 may be free standing via deployment of the horizontal frame 240 and optional deployment of side supports 265 and 270 as described hereinabove. The outdoorsman 400 may have deployed the cushion 380 (described above) to serve as a barrier against cold, damp, wet, or frozen ground surfaces or to provide comfort to the taken hunting stance while awaiting a shot.

As illustrated in FIG. 8, the outdoorsman 400 may kneel, crouch, or sit with the multifunctional pack frame 100 free standing in front of and optionally leaning away from him or her. In this embodiment of use, the side of the vertical frame 110 that is positioned closest to the user's back during the carrying of loads is now facing the user. The position of use illustrated in FIG. 8 may be referred to as a "high" rifle support position.

The height of the firearm support structure formed by second pair of lengths of tubular material 150, 152 and third length of tubular material 154 (described above) may be adjusted via the holes 135 of the vertical frame 110 in cooperation with the position adjustment hole (not shown) of the vertical frame brace 140, also described above. In one embodiment, a removeable connector (not shown) such as, for example, a clevis bolt (not shown) may be inserted through the aligned holes to affix a desired position of the vertical frame brace 140 which includes the firearm support structure. Accordingly, the height of the vertical frame brace 140 can be adjusted in position and allows the outdoorsman 400 to find the "high" level that is most comfortable for use.

In one embodiment of use of this "high" position, the outdoorsman 400 may kneel, crouch, or sit behind the frame, as illustrated in FIG. 8, and may rest a firearm forend 410 upon the third length of tubular material 154 of the vertical frame brace "M" like structure. In this manner, the multifunctional pack frame 100 will absorb a substantial part of the weight of the firearm 405 and allow the outdoorsman 400 to comfortably await a game harvest shot.

FIG. 9 illustrates another embodiment that is similar to the "high" use of the multifunctional pack frame 100 as a firearm support described above. In the embodiment of FIG. 9, the outdoorsman 500 may utilize the horizontal frame 240 and a firearm support structure formed by the fifth pair of lengths of tubular material 250 and 252 and sixth length of tubular material 254 (described hereinabove) to form a second firearm support structure for use when the multifunctional pack frame 100 is used in a "low" position. This "low" position is advantageous when the outdoorsman 500 desires to lie prone while awaiting a game harvest shot.

In this embodiment, the outdoorsman places the side of the vertical frame 110 that, in use, is positioned closest to the user's back downward towards the ground and in front of him while lying in the prone position. This causes the horizontal frame 240 to extend upwardly into the air and allows the horizontal frame "M" structure formed by the fifth pair of lengths of tubular material 250, 252 and sixth length of tubular material 254 to be utilized as a firearm forend 410 support in the same manner as previously described for the "high" position use. In this manner, the multifunctional pack frame 100 and, in particular, the horizontal frame 240, will absorb a substantial part of the weight of the firearm 405 and allow the outdoorsman 500 to comfortably await a game harvest shot.

Figure 10:
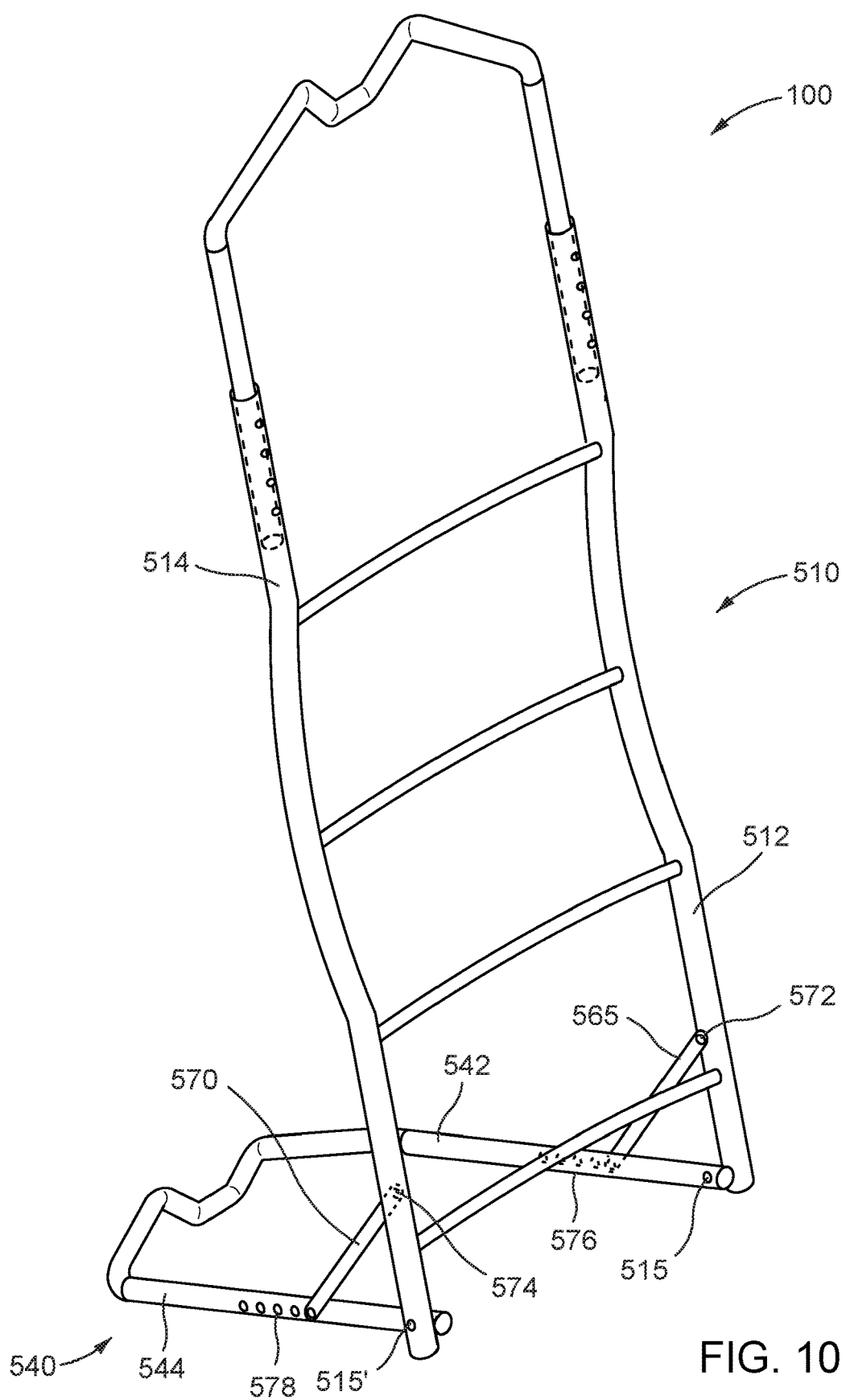
FIG. 10 is a perspective view of another embodiment of the multifunctional pack frame.
Figure 11:
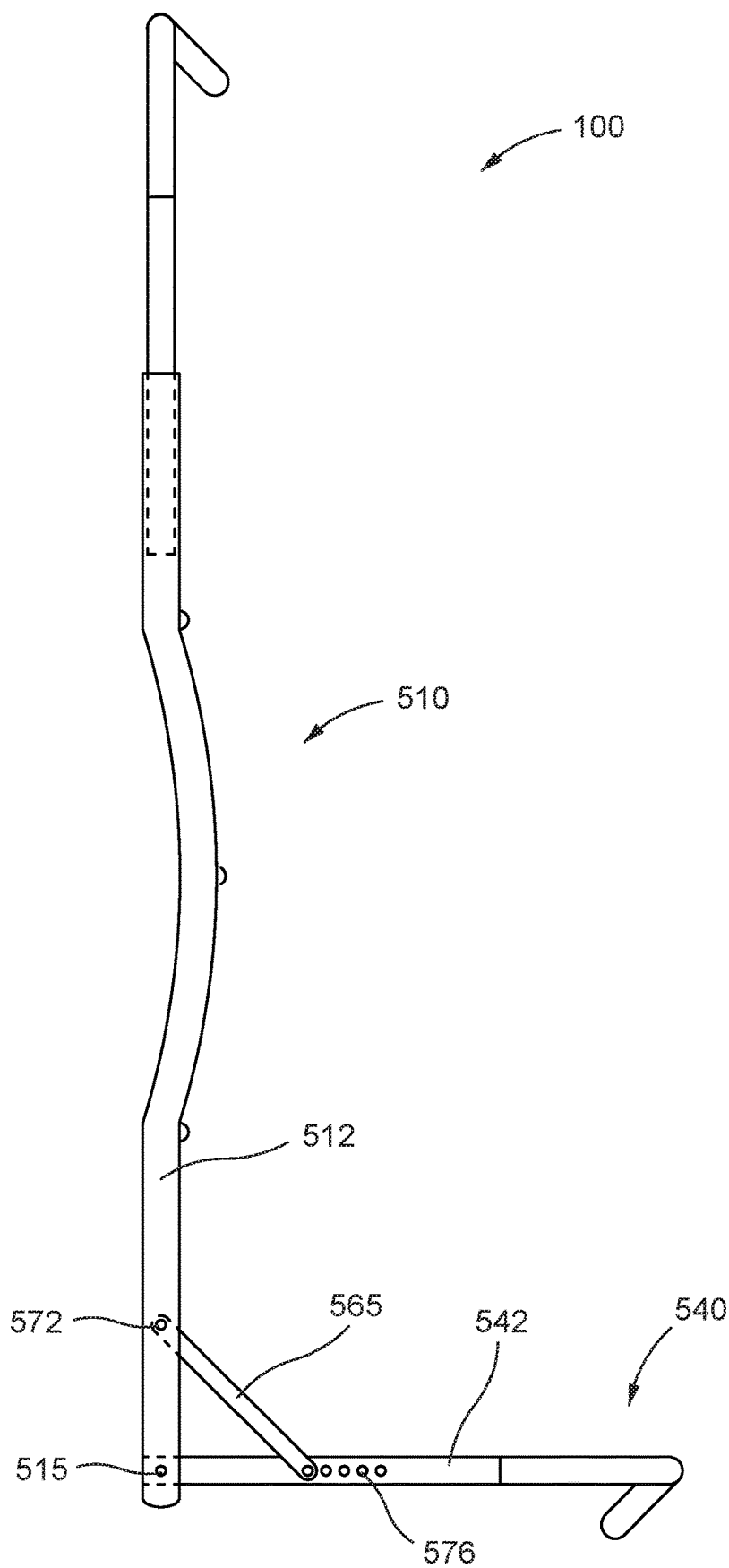
FIG. 11 is a side view of another embodiment of the multifunctional pack frame.

A second embodiment of the multifunctional pack frame 100 described herein is generally illustrated in FIGS. 10 and 11. Similar to the first embodiment, the multifunctional pack frame 100 has seven major components: 1) a vertical frame; 2) a horizontal frame; 3) an adjustable angle frame connecting arrangement; 4) side supports; 5) a plurality of removable component connectors; 6) a pack bag; and 7) a cushion. Numerous components of the second embodiment are substantially identical to those described above in relation to the first embodiment. For brevity and clarity, identical components will not be re-described. Rather, the disclosure will focus on the components which cooperate to provide the second embodiment's features. The second embodiment utilizes a modified horizontal frame, an alternative adjustable angle connection arrangement between the vertical frame and the horizontal frame, and alternative side support components. The remaining components, in particular the vertical frame, the component connectors, the bag or pack, and the seating pad arrangement remain substantially as described above.

Turning now to FIG. 10, in this embodiment the horizontal frame 540 is substantially identical to the horizontal frame shown and described above. However, due to the pivoting connection between this embodiment's vertical frame 510 and the horizontal frame 540 (described below), horizontal frame 540 overall width is narrower so that the horizontal side rails 542 and 544 may fit inside of and adjacent the vertical side rails 512 and 514, as can be seen in FIG. 10. In one embodiment, horizontal side rails 542 and 544 are one inch in diameter and braced in a manner to be spaced approximately 14.5-inches from each other, the outside distance between the horizontal side rails 542 and 544 should be no greater that 12.5 inches. Connecting the outer edges of the horizontal side rails 542 and 544 to the inner edges of vertical side rails 512 and 514 allows pivoting connections to be made at pivoting connection points 515 and 515' (described more fully hereinbelow) to be formed between the vertical frame 510 and the horizontal frame 540.

In one embodiment, other suitable dimensions for materials and spacing may be used. Additionally, because the horizontal side rails 542 and 544 do not cooperate in a fitted manner with vertical side rails 512 and 514 and upwardly extending protrusions 115 and 115' as in the embodiment previously described, the tubing utilized to construct the horizontal frame 540 is not restricted in diameter size. Thus, the horizontal frame may be manufactured from the same tubing as the vertical frame 510, or from a tubing of different diameter size such as a smaller diameter tubing.

In one embodiment, the endpoints of each of the horizontal side rails may be smooth and rounded as illustrated in FIG. 10. The endpoints are facing the user's body during use and are rounded to provide user comfort should the user contact the endpoints during use of the multifunctional pack frame 100.

The pivoting connection between the vertical frame 510 and the horizontal frame 540 of FIGS. 10 and 11 is formed with the clevis bolt (not shown) and cotter pin (not shown) arrangement utilized throughout the multifunctional pack frame 100. Each vertical side rail endpoint and horizontal side rail endpoint has an alignment hole formed therethrough at pivoting connection points 515 and 515'. The vertical frame 510 and horizontal frame 540 are moved into close relationship and the pivoting connection points 515 and 515' are aligned so that an appropriate length clevis bolt can be inserted therethrough and secured with a cotter pin. The length of the clevis bold utilized for the pivoting connection here is selected in accordance with the diameters of the tubular frames being joined. In one embodiment, both the vertical frame and the horizontal frame are manufactured from one-inch diameter tubular metal, a 2.5-inch clevis bolt will be sufficient. In some embodiments, a compression washer (not shown) formed of rubber or the like may be disposed between the vertical frame 510 and the horizontal frame 540 during alignment. The washer may reduce wear between the vertical frame and horizontal frame components and aid in the ease of pivoting movement between the pieces.

Although the pivoting connection points 515 and 515' herein has been described as accomplished with the removeable clevis bolt and cotter pin arrangement common to the system which allows for user reconfiguration of the multifunctional pack frame 100, in some embodiments a permanent pivoting connection between the vertical frame 510 and horizontal frame 540 may be utilized.

As seen in FIGS. 10 and 11, the connection between the vertical frame 510 and the horizontal frame 540 in the adjustable angle connection embodiment is further trussed and supported by a pair of side supports 565 and 570. The side supports 565 and 570 function in compression support when the multifunctional pack frame 100 is supported in use in a backrest position or in a high or low firearm support position by the horizontal frame 540 as described above with respect to the fixed angle component connection embodiment.

The side supports 565 and 570 are constructed of solid light weight steel or of carbon fiber and are identically sized and shaped. In one embodiment, side supports 565 and 570 may be approximately 6.5 inches in length and have a central 0.25-inch connection location or hole disposed on each end approximately 0.5 inches from the ending edge. All edges on each side support frame connector may be rounded so that no sharp are hard edges are exposed.

In one embodiment, the side supports 565 and 570 may be attach on the inside of the vertical side rails 512 and 514 via connection locations such as holes 572 and 574, respectively, and to the outside of horizontal side rails 542 and 544 via one of connection locations (or connection holes) 576 and 578, respectively, as illustrated in FIGS. 10 and 11. In the profile view of FIG. 11, only one connection location hole 572 is illustrated. However, in some embodiments, one or more quarter inch diameter connection location holes 572 and 574 may be formed in predetermined locations along the sides of each of the vertical side rails 512 and 514, respectively. On each of the horizontal side rails 542 and 544 respectively, a plurality of connection locations such as quarter inch connection holes 576 and 578 are formed in predetermined locations along the sides of the horizontal side rails 542 and 544. The connection hole arrangement allows for the attachment of the side supports 565 and 570 between the vertical frame 510 and the horizontal frame 540 and provide compression support of vertical frame 510 as described above. Side supports 565 and 570 may be attached to the vertical frame 510 and the horizontal frame 540 by component connectors such as the clevis bolt and cotter pin arrangement previously described.

In addition to providing compression support between the vertical frame 510 and the horizontal frame 540 in use, it should be appreciated that side supports 565 and 570 cooperate with the pivoting connections points 515 and 515' to establish and define the angle of connection between the vertical frame 510 and horizontal frame 540. As can be appreciated from a consideration of the arrangement illustrated in FIG. 11, connecting the side support 565 to a connection location such as connection hole 576 disposed distally along the horizontal side rail 542 of the horizontal frame 540 results in a smaller acute angle being formed between the vertical frame 510 and the horizontal frame 540. Thus, the user can adjust the angle of connection between the vertical frame 510 and the horizontal frame 540 by adjusting which connection hole 576 the side support 565 is attached to. As can be appreciated, side supports 565 and 570 may be connected to the horizontal frame and the vertical frame by the component connectors discussed hereinabove.

The pivoting connection arrangement having a user adjustable angle of connection between vertical frame 510 and horizontal frame 540 provides a number of advantages to the user. In one embodiment, when the multifunctional pack frame 100 is utilized as a backrest for the user, as described above, the pivoting connection arrangement allows the user to adjust the angle of incline of the vertical frame 510 from a near vertical incline to a comfortably relaxed angle of incline. Thus, the user can customize the backrest angle to his preferences or accommodate using the multifunctional pack frame 100 as a backrest on inclined ground. As can be appreciated, the adjustable angle connection arrangement may allow for greater user comfort.

The pivoting connection arrangement having a user adjustable angle of connection between vertical frame 510 and horizontal frame 540 allows for user adjustment and customization of the position of the firearm support structure of the multifunctional pack frame 100. When the multifunctional pack frame 100 is used in the "high" position described above, adjusting the angle of incline of the vertical frame 510 with respect to the horizontal frame 540 support effectively raises or lowers the position of the "M" shaped firearm forend support structure. As can be appreciated in the same manner, use of the firearm support structure in the "low" position, as described above, can be fine-tuned to the user's desired position.

As can be appreciated, the described second embodiment having an adjustable angle of connection between vertical frame 510 and horizontal frame 540 includes the same vertical frame distal end "M" shaped structures and horizontal frame distal end "M" shaped structures described hereinabove. The described second embodiment may similarly function as a "high" or a "low" firearm aiming support as described hereinabove with respect to FIGS. 8 and 9.

Figure 12:
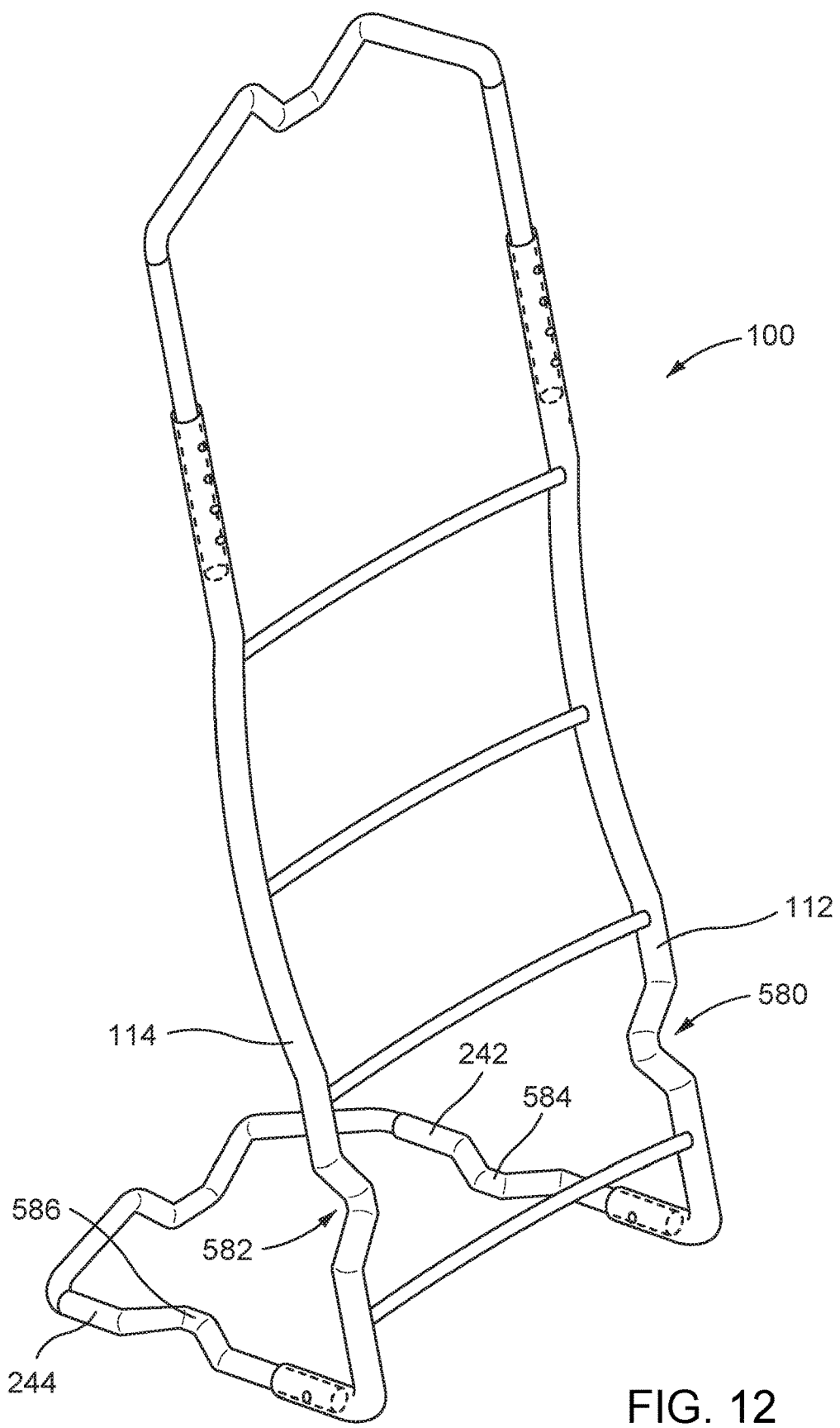
FIG. 12 is a perspective view of another embodiment of the multifunctional pack frame.

In yet another embodiment, the vertical side rails 112 and 114 of vertical frame 110, and the horizontal side rails 242 and 244 of horizontal frame 240 may include additional structural features to provide another embodiment of firearm forend support. Turning to FIG. 12, each vertical side rails 112 and 114 of vertical frame 110 and horizontal frame 240 further includes a formed indentation or notch illustrated as a "V" shaped notches. First notch 580 is located on vertical side rail 112. Second notch 582 is located on vertical side rail 114. Third "notch is located on horizontal side rail 242. Fourth notch 586 is located on horizontal side rail 244. As can be appreciated, the aspects of this "side support" embodiment may be applied equally to a multifunctional pack frame 100 having a fixed angle of connection between vertical frame 110 and horizontal frame 240 or to a multifunctional pack frame 100 having an adjustable angle of connection between vertical frame 110 and horizontal frame 240.

In one embodiment, multifunctional pack frame 100 may be laid on the ground with vertical side rail 114 and horizontal side rail 244 contacting the ground surface. Notch 580 of vertical side rail 112 and notch 584 of horizontal side rail 242 may then be used cooperatively to support a firearm forend. Spaced apart notch pair 580 and 584 provides additional firearm forend stability and may allow for a firearm to be placed in a manner to fully support the firearm weight. As can be appreciated, spaced apart notch pair 582 and 586 may be cooperatively used should the multifunctional pack frame 100 be supported by vertical side rail 114 and horizontal side rail 244.

Although notches 580, 582, 584 and 586 are illustrated as "V" shaped in the embodiment of FIG. 12, in other embodiments the notches may be other shapes such as a curved "U" shape or a squared "U" shape. Further, in other various embodiments two or more notches may be formed on each of the vertical side rails or the horizontal side rails to provide a variety of options for side notch pairing during firearm support use. Each notch may be of a different suitable shape. For example, in one embodiment, "V" shaped notches may be formed on the left side of multifunctional pack frame 100 and "U" shaped notches may be formed on the right side of multifunctional pack frame 100 thereby allowing the user greater flexibility of firearm support options in this side support embodiment.

As can be seen, a multifunctional pack frame 100 has been described herein. The multifunctional pack frame 100 provides various advantages and features as described. As will be appreciated by one of ordinary skill in the art, various alternatives are possible. These, and other modifications and advantages will be apparent without departing from the scope of the disclosure and applicant intends to be bound only by the claims appended hereto.

I claim:

1. A pack frame comprising:
a vertical frame comprising a first side rail and a second side rail, the first side rail having a first length, a first proximal end and a first distal end; the second side rail having a second length, a second proximal end, and a second distal end; and the first side rail and the second side rail are connected at the first distal end and the second distal end by a vertical frame brace;
a horizontal frame comprising a third side rail and a fourth side rail, the third side rail having a third length, a third proximal end, and a third distal end; the fourth side rail having a fourth length, a fourth proximal end, and a fourth distal end; and the third side rail and the fourth side rail are connected at the third distal end and the fourth distal end;
the first side rail has a first protrusion extending from the first proximal end at a first angle and the second side rail has a second protrusion extending from the second proximal end at a second angle; the first angle and the second angle are equivalent and acute;
and the third proximal end is removably connected to the first side rail via the first protrusion and the fourth proximal end is removably connected to the second side rail via the second protrusion thereby connecting the vertical frame and the horizontal frame in an acute angle relationship.

2. The pack frame of claim 1 further comprising:
a first side support and a second side support, wherein the first side support is removably connected between the first side rail and the third side rail, and the second side support is removably connected between the second side rail and the fourth side rail.

3. The pack frame of claim 1, wherein the vertical frame brace further comprises:
a first side piece for connection with the first distal end;
a second side piece for connection with the second distal end;
the first side piece and the second side piece are connected at a width via a plurality of lengths of tubular material including a first pair of lengths of tubular material, a second pair of lengths of tubular material, and a third length of tubular material; the plurality of lengths of tubular material extend between and connect the first side piece to the second side piece; and the first plurality of lengths of tubular material cooperate to form an indentation at a center point of the width.

4. The pack frame of claim 1 wherein the third distal end and the fourth distal end are connected at a width via a plurality of lengths of tubular material including at least a fourth pair of lengths of tubular material, a fifth pair of lengths of tubular material, and a sixth length of tubular material;
the plurality of lengths of tubular material extend between and connect the third distal end to the fourth distal end, and
the plurality of lengths of tubular material cooperate to form an indentation at a center point of the width.

5. The pack frame of claim 1 further comprising:
a first side piece for connection with the first distal end; and
a second side piece for connection with the second distal end;
the first side piece and the second side piece are connected at a width via a plurality of lengths of tubular material including a first pair of lengths of tubular material, a second pair of lengths of tubular material, and a third length of tubular material;
the plurality of lengths of tubular material extend between and connect the first side piece to the second side piece;
the first plurality of lengths of tubular material cooperate to form an indentation at a center point of the width; and
the third distal end and the fourth distal end are connected at a width via a plurality of lengths of tubular material including at least a fourth pair of lengths of tubular material, a fifth pair of lengths of tubular material, and a sixth length of tubular material; the plurality of lengths of tubular material extend between and connect the third distal end to the fourth distal end, and the plurality of lengths of tubular material cooperate to form an indentation at a center point of the width.

6. The pack frame of claim 1 further comprising:
a pack bag having one or more compartments;
straps for releasably attaching the pack bag to the vertical frame;
a shoulder harness attached to the pack bag; and
a hip belt attached to the pack bag.

7. The pack frame of claim 6 further comprising:
a detachable sleeve connectable to the pack bag, and
a cushion removably contained within the detachable sleeve.

8. The pack frame of claim 1 further comprising:
at least one first notch disposed along the first length.

9. The pack frame of claim 1 further comprising:
a plurality of cross braces, the first side rail and the second side rail are connected by the plurality of cross braces.

10. The pack frame of claim 1 further comprising the first side rail having a first curve centered approximately at a first length midpoint and the second side rail having a second curve centered approximately at a second length midpoint.

11. The pack frame of claim 1 comprising:
at least one of the first side rail, the second side rail, the third side rail, and the fourth side rail further comprising a v-shaped notch formed in the respective first length, second length, third length or fourth length.

12. A pack frame comprising:
a vertical frame comprising a first side rail and a second side rail; the first side rail having a first length, a first proximal end, and a first distal end; the second side rail having a second length, a second proximal end, and a second distal end; the first side rail and the second side rail having a curve centered approximately at a midpoint of each of the first side rail and the second side rail; and the first side rail and the second side rail are connected at the first distal end and the second distal end by a vertical frame brace;
a horizontal frame comprising a third side rail and a fourth side rail, the third side rail having a third length, a third proximal end, and a third distal end; and the fourth side rail having a fourth length, a fourth proximal end, and a fourth distal end, and the third side rail and the fourth side rail are connected at the third distal end and the fourth distal end;
a first side support having a first end and a second end;
a second side support having a third end and a fourth end;
the first proximal end is pivotably connected to the third proximal end, and the second proximal end is pivotably connected to the fourth proximal end, thereby connecting the vertical frame and the horizontal frame in a pivotably adjustable angle relationship; and
the first end of the first side support is connected near the first proximal end and the second end of the first side support is connected near the third proximal end, and the first end of the second side support is connected near the second proximal end and the second end of the second side support is connected near the fourth proximal end.

13. The pack frame of claim 12, wherein the vertical frame brace further comprises:
a first side piece for connection with the first distal end;
a second side piece for connection with the second distal end;
the first side piece and the second side piece are connected at a width via a first plurality of lengths of tubular material including a first pair of lengths of tubular material, a second pair of lengths of tubular material, and a third length of tubular material;
the first plurality of lengths of tubular material extend between and connect the first side piece to the second side piece; and
the first plurality of lengths of tubular material cooperate to form an indentation at a center point of the width.

14. The pack frame of claim 12, wherein the third distal end and the fourth distal end are connected at a width via a second plurality of lengths of tubular material including at least a fourth pair of lengths of tubular material, a fifth pair of lengths of tubular material, and a sixth length of tubular material;
the second plurality of lengths of tubular material extend between and connect the third distal end to the fourth distal end, and
the second plurality of lengths of tubular material cooperate to form an indentation at a center point of the width.

15. The pack frame of claim 12 further comprising:
a first side piece for connection with the first distal end;
a second side piece for connection with the second distal end;
the first side piece and the second side piece are connected at a width via a first plurality of lengths of tubular material including a first pair of lengths of tubular material, a second pair of lengths of tubular material, and a third length of tubular material; the first plurality of lengths of tubular material extend between and connect the first side piece to the second side piece; the first plurality of lengths of tubular material cooperate to form an indentation at a center point of the width;

the third distal end and the fourth distal end are connected at a width via second a plurality of lengths of tubular material including at least a fourth pair of lengths of tubular material, a fifth pair of lengths of tubular material, and a sixth length of tubular material;

the second plurality of lengths of tubular material extend between and connect the third distal end to the fourth distal end, and the second plurality of lengths of tubular material cooperate to form an indentation at a center point of the width.

16. The pack frame of claim 12 further comprising:
a pack bag having one or more compartments;
straps for releasably attaching the pack bag to the vertical frame;
a shoulder harness attached to the pack bag; and
a hip belt attached to the pack bag.

17. The pack frame of claim 16 further comprising:
a detachable sleeve connectable to the pack bag, and
a cushion removably contained within the detachable sleeve.

18. The pack frame of claim 12 further comprising:
at least one first notch disposed along the first length.

19. The pack frame of claim 12 further comprising:
the third length has a first plurality of connection locations spaced along the third length and the second end is connected to a selected one of the first plurality of connection locations;

the fourth length has a second plurality of connection locations spaced along the fourth length, and the fourth end is connected to a selected one of the second plurality of connection locations; and the pivotably adjustable angle relationship between the vertical frame and the horizontal frame is adjustable and dependent upon the selected ones of the first plurality of connection locations and second plurality of connection locations.

20. The pack frame of claim 12 further comprising:
a plurality of cross braces, wherein the first side rail and the second side rail are connected by the plurality of cross braces.

* * * * *